(12) United States Patent
Alm et al.

(10) Patent No.: US 12,187,233 B2
(45) Date of Patent: Jan. 7, 2025

(54) CROSSBAR AND COUPLING MEMBER FOR A CROSSBAR

(71) Applicant: Thule Sweden AB, Hillerstorp (SE)

(72) Inventors: Henrik Alm, Vederslov (SE); Jonas Poulsen, Varnamo (SE); Tobias Rydholm, Tenhult (SE); Wilhelm Larsson, Varnamo (SE); Joakim Persson, Skillingaryd (SE); Magnus Ferman, Varnamo (SE); Fredrik Bergman, Vaggeryd (SE); Lucas Lund, Norrahammar (SE)

(73) Assignee: Thule Sweden AB, Hillerstorp (SE)

( * ) Notice: Subject to any disclaimer, the term of this patent is extended or adjusted under 35 U.S.C. 154(b) by 111 days.

(21) Appl. No.: 17/796,498

(22) PCT Filed: Jan. 28, 2021

(86) PCT No.: PCT/EP2021/051976
§ 371 (c)(1),
(2) Date: Jul. 29, 2022

(87) PCT Pub. No.: WO2021/152007
PCT Pub. Date: Aug. 5, 2021

(65) Prior Publication Data
US 2023/0331168 A1  Oct. 19, 2023

(30) Foreign Application Priority Data
Jan. 30, 2020 (EP) .................................... 20154667

(51) Int. Cl.
*B60R 9/052* (2006.01)
*B60R 9/058* (2006.01)
*F16B 7/04* (2006.01)

(52) U.S. Cl.
CPC .............. *B60R 9/052* (2013.01); *B60R 9/058* (2013.01); *F16B 7/0413* (2013.01)

(58) Field of Classification Search
CPC ......... B60R 9/04; B60R 9/052; F16B 7/0413; Y10T 403/55
(Continued)

(56) References Cited

U.S. PATENT DOCUMENTS

| 3,606,432 | A | * | 9/1971 | Honatzis | ................. | B60R 13/04 |
| | | | | | | 52/716.6 |
| 4,449,656 | A | * | 5/1984 | Wouden | ................. | B60R 9/045 |
| | | | | | | 224/329 |

(Continued)

FOREIGN PATENT DOCUMENTS

| EP | 0 626 294 A1 | 11/1994 |
| WO | 99/19168 A1 | 4/1999 |

OTHER PUBLICATIONS

International Search Report and Written Opinion of the International Searching Authority in International Application No. PCT/EP2021/051976 (12 pages).

*Primary Examiner* — Justin M Larson
(74) *Attorney, Agent, or Firm* — Sterne, Kessler, Goldstein & Fox P.L.L.C.

(57) ABSTRACT

Disclosed is a coupling member fixable to an end portion of a crossbar member. The coupling member includes at least two elongate coupling segments configured to be at least partially inserted in longitudinally extending interior spaces of the crossbar member wherein the interior spaces are separated by a common interior wall. Two adjacent coupling segments of the at least two elongate coupling segments are fixedly coupled to each other by means of a coupling portion. The coupling portion is configured to hold the elongate coupling segments at a predetermined distance with respect to each other to define a receiving space between the (Continued)

adjacent elongate coupling segments. The receiving space is configured for receiving a portion of the interior wall of the crossbar member.

20 Claims, 18 Drawing Sheets

(58) Field of Classification Search
USPC .......................................................... 403/292
See application file for complete search history.

(56) References Cited

U.S. PATENT DOCUMENTS

| | | | | |
|---|---|---|---|---|
| 5,144,780 A * | 9/1992 | Gieling | ..................... | F16B 7/04 |
| | | | | 52/298 |
| 5,203,135 A * | 4/1993 | Bastian | ................. | F16B 7/0413 |
| | | | | 403/292 |
| 5,474,218 A * | 12/1995 | Arsenault, Jr. | ......... | B60R 9/052 |
| | | | | 296/180.1 |
| 6,279,802 B1 * | 8/2001 | Hickman | .................. | B60R 9/05 |
| | | | | 224/326 |
| 6,709,187 B2 * | 3/2004 | Loh | ......................... | E06B 3/667 |
| | | | | 403/292 |
| 7,043,795 B2 * | 5/2006 | Bosgoed | ................... | A47H 1/04 |
| | | | | 16/95 D |
| 7,524,130 B2 * | 4/2009 | Zenda | ....................... | F16B 7/18 |
| | | | | 403/379.3 |
| 8,333,311 B2 * | 12/2012 | Hubbard | ................. | B60R 9/058 |
| | | | | 224/320 |
| 8,544,707 B2 * | 10/2013 | Hubbard | ................... | B60R 9/05 |
| | | | | 296/180.1 |
| 9,132,782 B2 * | 9/2015 | Hubbard | ................. | B60R 9/058 |
| 10,040,485 B1 * | 8/2018 | Stojkovic | ............... | B62D 25/07 |
| 10,207,650 B1 * | 2/2019 | Banegas | ................... | B60R 9/06 |
| 11,040,667 B2 * | 6/2021 | Chen | ....................... | B60R 9/045 |
| 2007/0206989 A1 * | 9/2007 | Wagner | ............... | E04F 11/1836 |
| | | | | 403/292 |
| 2011/0174853 A1 | 7/2011 | Hubbard | | |
| 2018/0215322 A1 | 8/2018 | D'Angelo et al. | | |
| 2018/0222531 A1 | 8/2018 | Stojkovic et al. | | |

* cited by examiner

CROSSBAR AND COUPLING MEMBER FOR A CROSSBAR

FIELD OF THE INVENTION

The present invention relates to a coupling member fixable to a crossbar member as well as to a crossbar member. Furthermore, the invention relates to a rack system comprising a crossbar member and a coupling member.

BACKGROUND

Coupling crossbar members to further elements such as other crossbar members or load carrier feet has become more and more challenging in recent years owing to the construction of such crossbar members. Known profiles comprise complex geometries resulting from aerodynamical and safety requirements. Crossbars of load carriers have a considerable length as they are usually configured to provide support over the entire width of vehicles. This length makes stowing the crossbars and stowing racks comprising such crossbars difficult and often prevents a user from removing the same from the vehicle. Furthermore, it is often difficult to store or transport such crossbars or racks comprising such crossbars inside a car. Known systems thus have for example the drawbacks that the fuel consumption is increased due to lack of removal of racks, that it is difficult to equip rental cars with roof racks and that it is difficult to add a rack to the production line at a car manufacturer without putting it on the roof.

SUMMARY

In order to overcome the above drawbacks, crossbars may be constructed divisible so as to allow stowing them in a space saving manner, for example in the trunk of a vehicle. However, due to complex constructions of crossbars resulting from lightweight and aerodynamical constructions and safety requirements, dividing such crossbars and suitably coupling respective segments for use is very challenging. Furthermore, a suitable coupling between such crossbars and a load carrier foot is also necessary.

In view of the above, it is the object of the invention to provide an enhanced coupling member fixable to a crossbar member for coupling the crossbar member to another crossbar member or to a load carrier foot and to provide an enhanced crossbar member.

The object is solved by a coupling member according to claim 1 and claim 2 as well as by a crossbar member according to claim 8 and a crossbar member according to claim 9. Advantageous further formations are subject of the dependent claims.

A coupling member fixable to an end portion of a crossbar member is disclosed. The coupling member can be configured for coupling two crossbar members to each other. Alternatively, the coupling member can be configured for coupling a crossbar member to a load carrier foot. In such a case, the coupling member can be a part, preferably an integral part, of the load carrier foot. Accordingly, the coupling member only provides one of the latter coupling functions and does in particular not provide an additional function of securing a load to a crossbar member or crossbar.

The coupling member can comprise one or more coupling segments, preferably at least two elongate coupling segments, preferably three coupling segments. Each of the coupling segments can be configured to be at least partially inserted in longitudinally extending interior spaces of the crossbar member, preferably such that said coupling member is fully accommodated within the crossbar member at least in a portion of the coupling member where the coupling segment is inserted in an interior space. In this way, a load is distributed or transferred over a large surface. At least one of the coupling segments can be formed as a profile, in particular as a counter profile or mating profile to a crossbar member, preferably a crossbar member profile. Accordingly, a coupling segment can form an inner profile mating with an outer profile defined by a crossbar member.

One or more of the elongate coupling segments can be configured for a direct engagement with a crossbar member. For that, one or more of the elongate coupling segments can comprise an engagement portion non-movably formed thereon. Preferably, one or each engagement portion is integrally formed with the coupling segments. Preferably, one or each engagement portion is configured to engage behind an interior engaging portion of the crossbar member. In this way, a positive locking connection between the inserted elongate coupling segment and the crossbar member can be achieved. Accordingly, if an elongate coupling segment is configured as inner profile and the crossbar member is configured as an outer profile, the inner profile can be coupled to the outer profile inside the outer profile such that a coupling of adjacent walls of two profiles overlapping each other is possible without the need to use an additional fixation means. Coupling the elongate coupling segments with the crossbar member can thus be achieved tool-free, i.e. without the user having to use a tool for engaging the coupling segment and the crossbar member with each other. In this manner, two profile walls can be coupled to each other in a manner preventing a separation of one of the walls from the other wall, for example a lifting of the outer wall with respect to the coupling segment in case external forces act on the crossbar member. Preferably, the coupling segment is configured to engage behind the interior engaging portion of the crossbar member, preferably a crossbar member comprising a closed profile, upon inserting the elongate coupling segment in the crossbar member. In the context of the present disclosure, a closed profile is to be understood as a profile defining an interior space surrounded by an unbroken or continuous wall. In this way, the above-mentioned tool free engagement can be achieved simply by sliding the elongate coupling segment into the crossbar member. In addition or alternatively, the configuration can be such that an engagement behind the interior engaging portion is achieved in a direction cross to the insertion direction of the coupling member.

The interior spaces of the crossbar member can be separated by a common interior wall. The elongate coupling segments can at least partially comprise outer peripheral surface portions oriented towards each other or facing each other thereby forming a receiving space or channel between them. Each coupling segment can comprise an outer peripheral surface which corresponds to a respective inner surface of said crossbar member limiting the interior space in which the respective elongate coupling segment is to be inserted. The coupling segments may be formed matingly with the interior spaces so that when a coupling segment is inserted in an interior space it mates with and substantially fills the interior space over a predetermined length. In this way, the coupling segments are snugly fittable in the interior spaces of the crossbar member. The elongate coupling segments can be hollow.

Two adjacent coupling segments of the at least two elongate coupling segments are fixedly coupled to each other by means of a coupling portion. The coupling portion is configured to hold the elongate coupling segments at a predetermined distance with respect to each other to define a receiving space, in particular the above mentioned receiving space between outer peripheral surface portions of the elongate coupling segments, between the adjacent elongate coupling segments. The receiving space is configured for receiving a portion of the interior wall of the crossbar member. The predetermined distance can be smaller than the dimension in cross direction of the crossbar member of each of the coupling segments and is preferably 5 mm or smaller, preferably 3 mm or smaller. Thus, adjacent coupling segments can be spaced from each other by a distance which is 5 mm or smaller, preferably 3 mm or smaller, more preferably 2 mm or smaller.

According to a preferable embodiment, each of the elongate coupling segments can comprise a cantilevered portion insertable in the interior spaces, preferably fully accommodatable in an interior space which is preferably closed in cross section. The cantilevered portion can extend from the above-mentioned coupling portion. In addition or alternatively the coupling portion extends between outer circumferences of the adjacent coupling segments, preferably only between outer circumferences or outer peripheral surface portions of the adjacent coupling segments. In such a configuration, the elongate coupling segments define the overall length of the coupling member and the coupling portion does not add length to the construction.

Alternatively or in addition, the coupling portion is provided at a position within the length of the coupling segments. In addition or alternatively, the coupling portion extends on the adjacent coupling segments over a predetermined distance along the longitudinal direction of the coupling segments. In addition or alternatively, the coupling portion can comprise a length which is shorter than the length of the coupling segments. In addition or alternatively, the coupling portion comprises a length which is smaller than half of the length of the coupling segments. In addition or alternatively, the coupling portion is positioned at a distance from longitudinal ends of the adjacent coupling segments such that the coupling segments are spaced from each other on opposite sides of the coupling portion. In addition or alternatively, the elongate coupling segments can be coupled by means of more than one coupling portion. Each coupling portion may be configured to reduce stresses by being formed with a curved outer surface.

According to a further preferable embodiment, the coupling member may further comprise at least one engagement portion configured for an engagement with an interior portion of the crossbar member, preferably with a supporting surface, also referred to as force receiving surface, formed on a protrusion provided in the interior of the crossbar member. The engagement portion can be a protrusion, preferably a hook-like protrusion. The engagement portion can be configured for an engagement with a protrusion or engaging portion formed inside the crossbar member. The protrusion or engaging portion can be a protrusion or engaging portion operatively coupled to an upper portion of the crossbar segment and/or can provide a supporting surface or force receiving surface configured for an application of a clamping force, preferably for an application of a clamping force in a direction inwards into the crossbar member, preferably towards a lower portion of the crossbar member. The engagement portion can be provided on an upper portion of the coupling member. A lower portion of the coupling member, in particular a lower portion of the elongate coupling segments, can be configured to contact a lower inner wall defining the interior spaces. The engagement portion is preferably formed on the coupling member in such a manner that the coupling member is slidable into the crossbar member with a small space between a lower outer surface portion of the coupling member and an inner wall of the crossbar member. In this way, a clamping fixation between coupling member and crossbar member can be achieved by pushing the coupling member against the lower inner wall of the crossbar member thereby pushing the protrusion or engaging portion in the same direction. In this way, the protrusion can be held at a constant position with respect to the lower portion of the crossbar member preventing a deformation of the crossbar member upon application of external forces thereon. Stresses in the crossbar member profile are thus reduced.

According to a further preferable embodiment, the engagement portion is provided on the coupling member at a longitudinal position adjacent to or partially overlapping with the coupling portion. In addition or alternatively, the engagement portion can be provided on a side of the coupling portion opposite to the side where the receiving space is formed such that the receiving space, the coupling portion and the engagement portion are arranged in this order one after another in longitudinal direction of the coupling member. With the latter configuration, it is possible to hold an upper portion of the crossbar member and a lower portion of the crossbar member together in an end portion of the crossbar member, preferably at a position in which a passage for receiving the coupling portion is provided in interior walls in the crossbar member. Such interior walls normally reinforce the overall profile so that the provision of a passage connecting adjacent interior spaces of the crossbar member may weaken the overall structure in the region of the passage. Thus, by using a coupling member as described before, the missing wall portion may be compensated by the coupling member as it provides a connection between the upper portion and the lower portion of the crossbar member. In addition or alternatively, engagement portions can be provided on both sides of the coupling portion wherein preferably one engagement portion is provided at a free end of the coupling segments at a position where the receiving space is formed.

When being configured for coupling two crossbar members, the coupling member can be configured symmetrically with respect to a middle portion of the coupling member and may thus comprise two symmetrical portions extending from a common middle portion. In other words, the coupling member can be configured such that respectively two elongate coupling segments are coupled to each other at the middle portion, preferably to form respective common elongate coupling segments. The middle portion can be a wall-like portion from which the elongate coupling segments protrude. The middle portion may be provided by a joining plane at which end portions of the elongate coupling segments are joined to each other. The elongate coupling segments can be joined such that they extend with respect to each other at an angle or meet each other at an angle. In this way, the coupling member can join crossbar segments such that the position at which the coupling member couples the two crossbar segments forms the highest portion in the thus formed crossbar. In such a symmetrical arrangement, a configuration can be provided in which along the longitudinal direction, the receiving space, the coupling portion, the engagement portion, a further engagement portion, a further coupling portion and a further receiving space are provided in this order. It is noted that the engagement portion and the further engagement portion may be formed integrally so that the middle portion in such a configuration is only visible if the symmetrical sections of the coupling portion meet each other at an angle. When being configured for coupling a crossbar member to a load carrier foot, the coupling member may only comprise one of the above-mentioned symmetrical portions.

According to a further preferable embodiment, at least one of the at least two elongate coupling segments is at least partially formed hollow and preferably comprises a hollow portion opened in an insertion direction of the coupling member. The hollow portion can be configured to receive an urging member for urging the coupling member towards an inner wall of the crossbar member, preferably towards a lower wall of the crossbar member, when the elongate coupling segments of the coupling member are positioned in the crossbar member. With such an urging member, a rattle free connection between the elements can be achieved. The urging member can be a plate-like member. The urging member may be coupled to a tightening mechanism for pushing or pulling the urging member against the inner wall of the crossbar member. The tightening mechanism may comprise a tightening member, for example a tightening bolt operatively coupled to the urging member, for example integrally formed with the urging member.

The tightening member may be threadedly engaged with the urging member so that a rotation of the tightening member leads to a displacement of the urging member along a longitudinal axis of the tightening member. Preferably, the tightening member is a screw. The screw may be arranged such that it is passed through an opening provided in a lower portion of the crossbar member and through an opening provided in a lower portion of an elongate coupling segment when the coupling member is inserted in the crossbar member. A threaded portion of the screw may be threadedly engaged with the urging member and a screw head may be supported on a lower outer surface of the crossbar member. Thus, when tightening the screw, the urging member clamps the coupling member against the lower portion of the crossbar member.

In an alternative configuration, the tightening member may be a shaft or bolt coupled to a hand operable locking member, for example a tightening lever. The shaft or bolt may be coupled to the urging member at one end and may be coupled to a pin on which the tightening lever is pivotably held. The tightening lever comprises a support surface which is configured to get in contact with the outer surface of the lower portion of the crossbar member. Thus, the tightening lever is configured to rest on the outer surface of the crossbar member in a tightened state. The support surface is formed as a cam surface with varying distance from a pivot axis defined by the pin. When the tightening lever is in an opened state, the distance between a support surface section facing the outer surface of the crossbar member and the pivot axis is smaller compared to the state where the tightening lever is in a closed stated. Accordingly, the rotation of the tightening lever changes the distance between a support surface section facing the urging member and the urging member so that a movement of the tightening lever while being supported on an outer surface of the crossbar member leads to a clamping movement of the urging member towards and away from the lower portion of the crossbar member. By using a tightening mechanism as described before, a quicker and rattle free attachment of crossbar segments can be achieved. In particular, a play between the members may be removed.

According to a preferably embodiment, the coupling member comprises a fixation portion configured to be coupled to a load carrier foot or is integrally formed with the load carrier foot. Alternatively, the coupling member is configured to be coupled to a crossbar segment on each longitudinal end thereof. Alternatively or in addition, the coupling member is made from plastic or steel.

According to a preferably embodiment, the coupling member comprises a self-locking capability so that it automatically engages with a crossbar member in which it is inserted. The coupling member can be configured for a positive locking coupling with the crossbar member. The coupling member can comprise an engaging portion configured to engage with, preferably snap into, a receiving portion formed in the crossbar member. The engaging portion can comprise a protrusion and the receiving portion can comprise a recess or vice versa. The protrusion is arranged movable and operable by a user so as to disengage the engaging portion from the receiving portion when the coupling member is to be separated from the crossbar member.

Furthermore, a crossbar member as already introduced before is disclosed. The crossbar member can be a part of a crossbar of a vehicle mountable rack. The crossbar member comprises at least one hollow portion, preferably two hollow portions. The crossbar member can be formed by a closed profile. The crossbar member may comprise two or more hollow portions. Preferably, the crossbar member comprises three hollow portions. At least two of the at least two hollow portions, preferably three hollow portions, may extend in longitudinal direction of the crossbar member. For example, the at least two hollow portions can extend in longitudinal direction in such a manner that adjacent interior spaces of adjacent hollow portions are separated by a common interior wall. In other words, it can be said that the crossbar segment comprises an interior space which is divided into the two or more interior spaces by providing one or more separation walls in the crossbar segment.

Alternatively or in addition, the crossbar member can be formed by a closed profile comprising at least one hollow portion extending in longitudinal direction of the crossbar member and comprising an interior space for at least partially receiving a coupling member therein. The crossbar member can be configured for a direct engagement with a coupling member and can be configured so as to allow a tool-free coupling to a coupling member. This means that the crossbar member can be configured to be able to be engaged by the coupling member without the need for further elements for establishing such an engagement or any tools to be operated by a user, preferably by simply sliding a coupling member into the crossbar member in longitudinal direction. The least one interior engaging portion can be configured to be engaged from behind by an engagement portion of said coupling member, preferably upon inserting the elongate coupling segment in the crossbar member and/or preferably in a direction cross to an insertion direction of the coupling member. Preferably, the crossbar member comprises at least two hollow portions extending in longitudinal direction of said crossbar member in such a manner that adjacent interior spaces of adjacent hollow portions are separated by a common interior wall, wherein in an end portion of the crossbar member, a passage for connecting the adjacent interior spaces can be provided and the crossbar member can be configured to receive and accommodate a coupling member in at least two of the at least two interior spaces and the passage.

The hollow portions in the crossbar member can be arranged in series in a direction perpendicular to the longitudinal direction of the crossbar member, preferably in a direction of travel of a vehicle when the crossbar member is mounted on a vehicle. For example, in a mounted condition of a crossbar comprising such a crossbar member, the hollow portions may be arranged in series in horizontal direction.

A common interior wall can comprise any suitable shape. The common interior wall may be curved and/or bulged towards one of the interior spaces. The common interior wall can comprise a kink. Preferably, the common interior wall is a straight wall. Preferably, the common interior wall is a straight wall extending parallel with a longitudinal middle axis of the crossbar member. Preferably, the common interior wall extends from an upper portion of the crossbar member to a lower portion of the crossbar member. Preferably, the common interior wall extends in vertical direction. In case two interior walls are provided, the walls can be provided on opposite sides of a T-track provided in the upper portion of the crossbar member. One of the interior walls can be formed as a prolongation of a side wall of the T-track or in the region of a side wall of the T-track.

A passage for connecting the adjacent interior spaces is provided in an end portion of the crossbar member. This passage is configured to receive and accommodate a portion of a coupling member for coupling a crossbar member to another crossbar member or to a load carrier foot. In particular, the passage can be configured to receive such a coupling member in longitudinal direction of the crossbar member. Accordingly, the crossbar member can be configured to receive and accommodate a coupling member, for example a coupling member as described before in greater detail, in at least two of the at least two interior spaces and the passage. In this way, it is possible to use a coupling member that, one the one hand, makes use of at least two interior spaces for coupling the same to the crossbar member while, on the other hand, allowing a connection between portions of the coupling member that are inserted into the interior spaces inside the crossbar member. In this way, it is possible to bring the end portion of a crossbar member close to another member, for example another crossbar member or a portion of a load carrier foot, so that no gap is created by the coupling member or such a gap only comprises a very small dimension.

The passage is preferably extending along the longitudinal direction of the crossbar member over a predetermined length of the crossbar member. Furthermore, the passage can comprise a constant height, at least over a predetermined length in the longitudinal direction of the crossbar member. In case two or more interior walls with passages are provided, the passages can comprise the same dimensions. In either case, the dimensions of the passages are preferably configured to be mating with the shape and configuration of the coupling member to be accommodated.

According to a preferable embodiment, the passage is provided by omitting or removing at least a portion of the interior wall. Alternatively or in addition, the passage is provided by a slot formed in the interior wall or by completely removing the interior wall in the end portion. Alternatively or in addition, the passage comprises a length in longitudinal direction of the crossbar member which is preferably maximum 10% of the total length of the crossbar member. Alternatively or in addition the passage comprises a width which is preferably maximum 50% of a total width of the common interior wall. The passage may be provided by a cutting or milling operation. The passage may comprise or be a slot or an opening.

According to a preferable embodiment, the end portion is configured for a frictional connection with the coupling member, preferably for establishing a clamping connection between end portion and coupling member. Alternatively or in addition, the end portion may be configured for a mechanical locking, wherein preferably the crossbar member is configured to accommodate a clamping member, for example the urging member as described before in connection with the coupling member, in one of the interior spaces or comprises a clamping member in one of said interior spaces. The clamping member can be configured to engage with the coupling member and to push the coupling member against an inner wall of the crossbar member.

According to a preferably embodiment, the end portion can be configured such that an inserted coupling member is able to apply a clamping force on an upper portion and/or a lower portion of the crossbar member to hold an upper wall of the crossbar member and a lower wall of the crossbar member at a predetermined distance from each other, in particular to couple the upper portion and the lower portion together.

According to a preferable embodiment, the coupling member can comprise an engaging portion operatively coupled to the upper portion and configured for being pulled or urged towards the lower portion. The engaging portion can be configured to provide a force receiving surface, also referred to as supporting surface. The force receiving surface can be oriented towards the upper portion. Preferably, the force receiving surface is provided on a protrusion protruding from the upper portion. Preferably, the protrusion is formed on the upper portion and extends along the longitudinal direction, preferably over the entire length of the crossbar member.

According to a preferable embodiment, the profile of the crossbar member is wing, square, circular or oval shaped and is preferably made by extruding aluminum. In addition or alternatively, a fixation profile open on one side, for example on an upper side is provided in the upper portion for coupling accessories, for example a bike carrier, to the crossbar member. The fixation profile can be a T-track. In addition or alternatively, the crossbar member is a full-length crossbar couplable to load carrier feet at opposite ends thereof or is a crossbar segment of a divisible crossbar. Thus, a crossbar segment may be provided which may form a part of a divisible crossbar and may form such a divisible crossbar in combination with other crossbar segments. Accordingly, a crossbar may be formed with two or more of such crossbar segments by coupling them to each other using coupling members as described before. When forming a crossbar by means of multiple crossbar segments, crossbar segments of identical length or of different lengths can be used. For example, using two crossbar segments of identical length for forming the crossbar leads to a crossbar which is divided in its center portion. By using crossbar segments and one or more coupling members, it is possible to provide a divided or divisible crossbar and rack which enables a user or customer to easily fit the rack inside a vehicle. For example, it is possible to provide crossbar segments of a dimension allowing to store them in the trunk of a vehicle, for example in the compartment for stowing the spare wheel, preferably together with the spare wheel.

Furthermore, a rack system comprising at least one crossbar member, preferably a crossbar member as described before, and at least one coupling member, preferably a coupling member as described before for coupling said at least one crossbar member to another crossbar member or to a load carrier foot, is disclosed. The crossbar member comprises at least one hollow portion extending in longitudinal direction of the crossbar member and comprises an interior space for at least partially receiving a coupling member therein. The coupling member is fixable to an end portion of the crossbar member and is configured for coupling two crossbar members to each other or for coupling a crossbar member to a load carrier foot, wherein the coupling member can be a part, preferably an integral part, of the load carrier foot, the coupling member comprising one or more elongate coupling segments configured to be at least partially inserted in longitudinally extending interior spaces of the crossbar member. The crossbar member and the coupling member are preferably configured such that a fixation member, preferably a bolt, is passable through the crossbar member and an inserted coupling member for locking the coupling member to the crossbar member by connecting an upper wall and a lower wall of the crossbar member, preferably such that at least an end portion of the coupling member, preferably a bolt head or a nut, is accommodated within an outer contour of the crossbar member, preferably in a groove or other open profile used for fixation purposes such as a T-track or in an accommodating space formed below said T-track so as to not interfere with fixation members fixable in the open profile, such as accessory T-bolts. Preferably, the coupling member is at least accommodated and arranged such that at least one of its end portions does not protrude outside of an envelope of the crossbar member.

For coupling the coupling member to the crossbar member, it is possible to use different fixation principles. For example, it is possible to fix the members to each other by means of the above-mentioned urging member. Accordingly, clamping is achieved by pushing the coupling member against the crossbar member. Clamping may also be achieved by enlarging the outer contour of the elongate coupling segments when the same are inserted in the crossbar member. This may be achieved by exerting an enlarging force on the elongate coupling segments in radial outward direction. Furthermore, the dimension of the crossbar member may be reduced to clamp the coupling member therein by multiple forces pushing inwards, for example by means of a hose clamp like structure. Thus, different fixation principles can be applied for clamping the crossbar member to the coupling member.

According to a preferably embodiment or according to an independent further aspect, the rack system can comprise at least two crossbar members, preferably crossbar segments, wherein the end portions of the at least two crossbar members and the coupling segments of the at least one coupling member are mechanically and/or optically coded in order to assist a user in correctly assembling said at least two crossbar members and the at least one coupling member to form a crossbar. As regards a mechanical coding, it is possible to configure the end portions of crossbar members differently, for example by providing additional protrusions or recesses or differently shaped protrusions or recesses. For example, the common interior wall may be formed with different thickness in different crossbar segments. Furthermore, the above-mentioned passage may be provided at different positions or comprise different dimensions in different crossbar segments so that only correspondingly formed coupling members can be coupled thereto. Optical coding may be achieved by adding signs or colors to the respective members so that a user may easily identify mating elements or sections.

Preferably, the crossbar members and the at least one coupling member are configured to only fit together in a specific manner, in particular such that they are correctly coupled to form a rack system, in particular a front crossbar and a rear crossbar. Furthermore, in case a rack system with multiple crossbars and load carrier feet is provided, for example a rack system with a front crossbar and a rear crossbar, a mixing of parts between different crossbars, for example a front crossbar and a rear crossbar, is prevented and a fail-safe mounting is secured.

It is noted that the configuration of elements of a rack system including crossbar members and coupling members for interconnecting crossbar members or for coupling a crossbar member to a load carrier foot in a mechanically and/or optically coded manner may be seen as independent separate aspect without the limitations to the elements as mentioned before. In other words, the crossbar members do not necessarily have to comprise any of the above features but may comprise the above-mentioned features.

The same applies for the coupling member which may comprise the above-mentioned features. However, any coupling member may be used in connection with the mechanical and/or optical coding. Thus, an aspect may reside in a configuration comprising at least two crossbar members and a coupling member in which configuration the coupling member and the crossbar members are mechanically and/or optically coded to at least signalize or to allow a correct mounting of these parts to each other. In other words, the parts are configured such that they only fit to each other in a given order and, if multiple crossbars are provided in a system, in a predetermined crossbar, for example a front crossbar or a rear crossbar. For example, right and left crossbar members can be coded as front right and front left crossbar members and rear right and rear left crossbar members.

According to a preferable embodiment, the rack system comprises two or more elements forming a crossbar are connected to each other by means of a strap, preferably a resilient strap and/or preferably made from plastic. The elements may be elements forming a front crossbar or a rear crossbar of a vehicle, wherein the elements preferably include at least two crossbar members and at least one coupling member. In this way, mixing up the parts for a specific crossbar with parts of another crossbar is prevented.

Further embodiments can be gleaned from the different configurations given at the end of the detailed description of embodiments. It is noted that the configuration of coupling members and crossbar members may be suitable for any collapsible roof rack, particularly divisible or split type roof racks in which a crossbar and/or feet of the rack may be disassembled to a certain degree, in particular for space saving reasons, for example roof racks according to the embodiments and configurations as described before. The features and configurations as described in the following may be combined with other features as described in connection with other embodiments and configurations. In general, features may be suitably combined where possible and not technically excluded.

Further disclosed is a coupling member fixable to an end portion of a crossbar member. The coupling member can be configured for coupling two crossbar members to each other. The coupling member can comprise features of the coupling members as described before. The coupling member can comprise two or more elongate coupling segments configured to be at least partially inserted in a longitudinally extending interior space of the crossbar member. The coupling member can comprise a coupling portion for coupling longitudinal end portions of the elongate coupling segments to each other with at least two of the elongate coupling segments extending from opposite sides of the coupling portion.

The coupling portion can comprise a wall like portion. The coupling member can be configured non-symmetrically with respect to the coupling portion and/or wherein at least two elongate coupling segments of the coupling member extending from opposite sides of the coupling portion have a differing dimension and/or configuration, in particular a different length.

The coupling member can be configured symmetrically with respect to the coupling portion, for example in that at least two of the elongate coupling segments have an identical length or extend from the coupling portion in a mirrored manner, for example at the same angle from the coupling portion and/or with the same extension curvature.

A further rack system is disclosed. The rack system comprises a crossbar member and a coupling member couplable to the crossbar member. The crossbar member and the coupling member can be configured such that a fixation member is passable through the crossbar member and an inserted coupling member for locking the coupling member to the crossbar member by connecting an upper wall portion and a lower wall portion of the crossbar member so that at least a positive locking between the crossbar member and the coupling member is achieved to prevent a relative movement between coupling member and crossbar member in longitudinal direction.

The fixation member may be tightened such that the crossbar member exerts a pressing force on the coupling member such that both members are coupled in a press fit manner.

At least one end portion of the fixation member may be accommodated within an outer contour of the crossbar member, for example in a groove or other open profile used for fixation purposes, for example a T-track, or in an accommodating space formed below the T-track, so as to not interfere with the fixation members fixable in the open profile, such as accessory T-bolts.

The fixation member can be accommodated and arranged such that at least one of its end portions does not protrude or extend outside of an envelope of the crossbar member.

Further disclosed is a coupling member configured for coupling two crossbar members. The coupling member may comprise features as already described before with respect to other coupling members. The coupling member can comprise two elongate coupling segments joined to each other by coupling longitudinal end portions of the elongate coupling segments to each other at a coupling portion of the coupling member. The coupling segments can be joined to each other such that they extend with respect to each other at an angle or meet each other at an angle.

The coupling member can be symmetrical with respect to a middle portion or a plane of symmetry of the coupling member at a position where the coupling segments are joined to each other at their longitudinal end portions.

The coupling member can be non-symmetrical with respect to a middle portion or a plane of symmetry of the coupling member at a position where the coupling segments are joined to each other at their longitudinal end portions.

The middle portion may comprise a coupling portion configured as a wall like portion.

The wall like portion may comprise a wedge shape. In particular, the wall like portion may comprise a wedge shape with abutment surfaces extending at an angle with respect to each other. The abutment surfaces are respectively formed in a plane and are configured for contacting longitudinal end portions of crossbar members.

The angle between the abutment surfaces can be smaller than 5 degrees or can be 2 degrees and/or wherein an angle of each abutment surface with respect to a middle plane is 2 degrees or smaller and may be 1 degree.

Further disclosed is a rack system comprising a collapsible crossbar comprising at least two crossbar members and at least one coupling member. The coupling member and/or the crossbar members are configured such that the crossbar members extend at or meet at an overcompensation angle with respect to each other, the overcompensation angle being predefined for substantially compensating for a bending of rack system, in particular of the collapsible crossbar, under load. The coupling member may be a coupling member as defined before. In such a configuration, the crossbar members may extend or meet at an angle equal to or greater than 175 degrees and smaller than 180 degrees, preferably at an angle of 178 degrees or greater.

Further disclosed is a crossbar member for a crossbar of a vehicle mountable rack. The crossbar member may be formed by a closed profile comprising at least one hollow portion extending in longitudinal direction of the crossbar member and comprising an interior space for at least partially receiving the coupling member therein. The crossbar member may comprise a safety mechanism which upon mounting the crossbar member to the coupling member actively forces a user to correctly interlock the coupling member and the crossbar member for properly fixing the crossbar member to the coupling member.

The safety mechanism may be configured to actively displace the crossbar member inserted on the coupling member away from a predetermined locking position on the coupling member such that the crossbar member and the coupling member are wrongly positioned with respect to each other if the crossbar member is not fixed to the coupling member at the predetermined locking position.

The safety mechanism may comprise an urging portion for applying a force on the coupling member in a direction urging the coupling member and the crossbar member away from each other so that correctly positioning the crossbar member on the coupling member has to be carried out against a predetermined urging force. In this way, the user is actively forced to push the parts to be coupled together against a repelling force.

The urging portion may comprise an urging member which is configured to provide a predetermined urging force on the coupling member when the crossbar member is correctly positioned on the coupling member.

The urging member may comprise an elastic member, for example a spring, in particular a coil spring.

The elastic member may be configured to apply a force in longitudinal direction of the crossbar member.

Further disclosed is a coupling member fixable to an end portion of a crossbar member. The coupling member may be configured for coupling two crossbar members to each other or for coupling a crossbar member to a load carrier foot. The coupling member can be a part, preferably an integral part, of the load carrier foot. The coupling member may comprise one or more elongate coupling segments configured to be at least partially inserted in a longitudinally extending interior space of the crossbar member. The coupling member may further comprise a safety mechanism which upon mounting the coupling member to the crossbar member actively forces a user to correctly interlock the coupling member and the crossbar member.

The safety mechanism may be configured to actively displace the crossbar member inserted on the coupling member such that the crossbar member and the coupling member are wrongly positioned with respect to each other for coupling the same.

The safety mechanism may comprise an urging portion for applying a force on the crossbar member in a direction urging the coupling member and the crossbar member away from each other so that correctly positioning the crossbar member on the coupling member has to be carried out against a predetermined urging force.

The urging portion may comprise an urging member which is configured to apply a predetermined urging force on the crossbar member when the crossbar member is correctly positioned on the coupling member.

The urging portion may comprise an elastic member, for example a spring, in particular a coil spring.

The elastic member may be configured to apply a force in longitudinal direction of the coupling member.

The coupling member may be configured for coupling two crossbar members to each other or for coupling a crossbar member to a load carrier foot. The coupling member can be a part, preferably an integral part, of the load carrier foot. The coupling member may comprise one or more elongate coupling segments configured to be at least partially inserted in a longitudinally extending interior space of the crossbar member. The coupling member may be a coupling member as described before. At least a portion of an outer circumferential surface of the at least one elongate coupling segment may be colored, for example in red color, for signalizing an incorrect coupling to a user if the crossbar member is wrongly positioned with respect to the coupling member.

Further disclosed is a rack system comprising a coupling member as described before and a crossbar member as described before.

A further embodiment of a coupling member is disclosed. Again, the coupling member is fixable to an end portion of a crossbar member. The coupling member is configured for coupling two crossbar members to each other or for coupling a crossbar member to a load carrier foot. The coupling member can be a part, for example an integral part of the load carrier foot.

The coupling member may comprise one or more elongate coupling segments configured to be at least partially inserted in a longitudinally extending interior space of the crossbar member.

The coupling member further comprises a locking mechanism for locking the coupling member to the crossbar member. The locking mechanism comprises an actuating portion configured to apply a clamping force on the crossbar member and an operating portion operatively coupled to the actuating portion for moving the actuating portion between a locking position and an unlocking position.

The actuating portion may be provided, for example accommodated, in a coupling segment of the one or more coupling segments.

The actuating portion can be movably held. For example, the actuating portion can be movably held in a direction cross to a main extension direction of one coupling segment of the one or more coupling segments by a spring mechanism. The direction may be a direction which is cross to the main extension direction. In particular, the direction may be perpendicular to the main extension direction. The main extension direction may be a longitudinal direction of the coupling segment. The spring mechanism may comprise a plate spring. The plate spring may be coupled to an upper wall of an elongate coupling segment, for example at two positions. The plate spring may comprise two end portions and each end portion may be coupled to the upper wall. Alternatively, the plate spring may be a cantilevered plate spring coupled to an upper wall of the elongate coupling segment at one end portion with the actuating portion being held or provided in an opposite end portion.

The actuating portion may comprise an engaging portion configured to engage with a receiving portion on the crossbar member.

The engaging portion may comprise a tapering portion tapering towards a forward end of the engaging portion. The tapering portion may comprise a conical engaging portion. The engaging portion may be configured to be inserted into the receiving portion, for example into a receiving opening formed in the receiving portion.

The actuating portion may comprise a threaded opening extending along a central axis and configured to be coupled to a force transfer portion. In addition or alternatively, the coupling member may comprise a supporting portion configured for non-rotatably supporting the engaging portion on the spring mechanism. The supporting portion may at least partially comprise a non-circular outer circumferential surface, for example with at least one plane surface area.

The actuating portion may be integrated in a lower wall portion of one of the one or more elongate coupling segments.

The coupling member may further comprise a force transfer portion for transferring an operating force from the operating portion to the actuating portion. The force transfer portion may comprise a rod or bolt, in particular a rod or bolt which is threadedly engageable with the actuating portion and/or the operating portion.

The operating portion may comprise a push arrangement operatively coupled to the force transfer portion and configured to apply a pushing force on the force transfer portion for moving the actuating portion. The push arrangement may comprise a push button operable by a user.

The operating portion may comprise a rotation arrangement operatively coupled to the force transfer portion for rotating the same. The rotation arrangement may comprise a torque limiting mechanism for limiting a force which may be applied on the force transfer portion. The force transfer portion may be coupled to the actuating portion such that a rotation of the force transfer portion is transferred into a translational movement of the actuating portion.

The rotation arrangement may be coupled to the force transfer portion, for example rotationally fixed but pivotable or longitudinally slidable, for example against an urging force of an urging member, so that the rotation arrangement may be pivoted with respect to or longitudinally displaced along the force transfer portion by a user, for example for establishing or releasing a positive locking of the rotation arrangement. The rotation arrangement may comprise a knob. The knob may comprise wings for grasping the same. Alternatively, the rotation arrangement may comprise a lever. The lever may comprise a coupling portion at a first end portion thereof. The coupling portion may comprise an accommodating recess which is non-circularly formed according to the shape of a counter portion on the force transfer portion. The counter portion may be a bolt head. Shapes of the accommodating recess and the counter portion may include a hexagonal, octagonal or other polygonal shape or a non-circular curved shape, for example an elliptical shape. The lever may comprise an engaging portion at a second end thereof. In case an engaging portion is provided, the engaging portion may be configured for an external engagement or an internal engagement to provide a positive locking with a further element for blocking a rotational movement of the rotation arrangement. For an internal engagement, the engaging portion may comprise a recess for accommodating a protrusion, for example a portion of the fixation member for coupling a crossbar member to the coupling member. Such a configuration may be referred to as internal rotation stop as an internal, non-visible engagement blocks a rotation of the rotation arrangement.

The lever may further comprise a supporting portion comprising a through opening for slidably receiving a portion of the force transfer portion and which may be arranged at a distance from the accommodating recess in an extension direction of an inserted force transfer portion. An urging member, for example a coil spring, may be provided in the space between the supporting portion and the coupling portion, for example such that the urging member contacts the supporting portion and a portion on the force transfer member, for example a bolt head, so that the lever may be moved along the force transfer member against an urging force of the urging member. The supporting portion may be configured to contact an inserted crossbar member on a side facing away from the coupling portion and to support the urging member on a side facing towards the coupling portion.

The operating portion may comprise a pull arrangement operatively coupled to the force transfer portion and configured to apply a pulling force on the force transfer portion for moving the actuating portion. The pull arrangement may comprise a lever arrangement operatively coupled to the force transfer portion by means of a pivot, for translatory moving the force transfer portion. The pull arrangement may comprise a lever with a rear supporting portion for supporting the same on an outer surface of the crossbar member and a forward supporting portion for supporting the same on an outer surface of a crossbar member. The rear supporting portion and the forward supporting portion may be provided on opposite sides of the pivot, for example on opposite sides of the pivot pin. The rear supporting portion may be coupled to the lever via an elastic portion and may be configured to contact an outer surface portion of the crossbar member. The forward receiving portion may be configured to get in contact with at least one actuating protrusion provided on the crossbar member. The actuating protrusion may be provided on an end portion of the crossbar member and may be configured to urge the forward supporting portion in a direction facing away from the coupling member, upon inserting the crossbar member on the coupling member so that the pivot is displaced and applies a pulling force on the force transfer portion.

The crossbar member may comprise an actuating protrusion on an outer surface of an end portion thereof for operating the pull arrangement. The actuating protrusion may comprise a lifting portion. The lifting portion may comprise a wedge like portion having an inclined surface which extends from the outer surface of the crossbar member and is configured to move the forward supporting portion in a direction away from the elongate coupling segment. The actuating protrusion may further comprise an arresting portion continuing from the lifting portion and comprising a recess in which the forward supporting portion may rest in a state in which the crossbar member is correctly inserted on the coupling member.

In addition or alternatively, an external rotation stop for the rotation arrangement may be provided. An accommodating portion configured to at least partially receive the rotation arrangement may be provided. The accommodating portion may be configured to conceal a portion of the rotation arrangement and/or may be configured to serve as an abutment portion or rotation stop for the rotation arrangement. The accommodating portion may be movably, slidably and/or pivotably arranged on the crossbar member so as to transfer the accommodating portion between a position in which the rotation arrangement is partially received therein and not allowed to rotate, and a position in which the rotation arrangement is not received therein and allowed to rotate. Accordingly, contrary to the before described internal rotation stop in which a positive locking is achieved by an internal engagement with the lever, an external rotation stop may be provided in which at least a portion of the lever is inserted into an accommodating portion to provide positive locking in rotational direction of the rotation arrangement.

A further coupling member fixable to an end portion of the crossbar member comprising a fixation profile is disclosed. The coupling member may be configured for coupling two crossbar members to each other or for coupling a crossbar member to a load carrier foot, wherein the coupling member can be a part, for example an integral part, of the load carrier foot. The coupling member may comprise one or more elongate coupling segments configured to be at least partially inserted in longitudinally extending interior spaces of the crossbar member. The coupling member may be configured such that in a mounted state in which a crossbar member is mounted on the coupling member, at least one elongate coupling segment of the one or more elongate coupling segments is provided below the fixation profile such that the fixation profile at least partially covers an upper portion of the at least one elongate coupling segment.

Further disclosed is a rack system comprising the latter described coupling member and a crossbar member comprising a fixation profile. The fixation profile may comprise a T-track open in an upward direction of the crossbar member.

Disclosed is also a rack system comprising a collapsible crossbar and 2 feet for mounting the crossbar to a vehicle. The crossbar may comprise a telescoping portion allowing to change in overall length of the crossbar for adapting the length of the crossbar two different vehicle types. The crossbar may comprise at least two crossbar members, for example crossbar members as described before with respect to other configurations and embodiments, wherein the crossbar members are mountable to each other to form the crossbar, for example using a coupling member as described before. At least one of the crossbar members may comprise a telescoping portion for changing a length of the crossbar member.

BRIEF DESCRIPTION OF THE DRAWINGS

The accompanying drawings, which are incorporated herein and form part of the specification, illustrate embodiments and, together with the description, further serve to explain the principles of the embodiments and to enable a person skilled in the art to make and use the embodiments.

Figure 1:
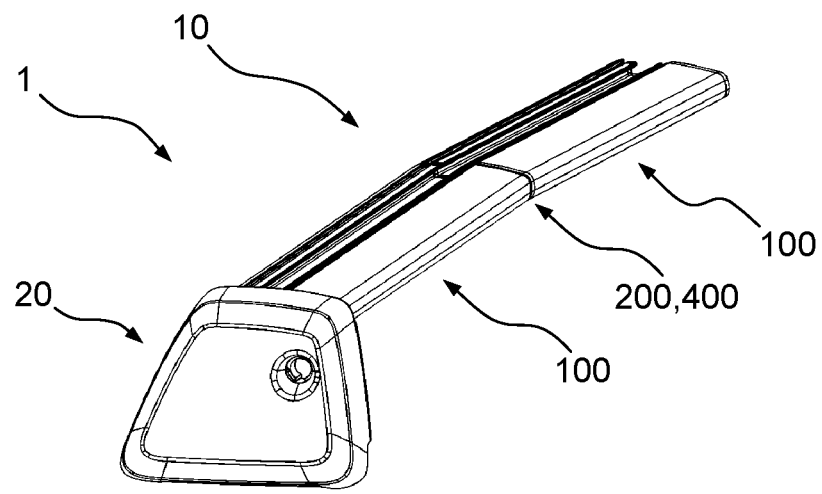
FIG. 1 shows a perspective view of elements of a load carrier according to an embodiment.

The features and advantages of the embodiments will become more apparent from the detailed description as given below when taken in conjunction with the drawings, in which like reference signs identify corresponding elements throughout. In the drawings like reference numbers generally indicate identical, functionally similar and/or structurally similar elements.

DETAILED DESCRIPTION OF EMBODIMENTS

Embodiments and modifications will be described in the following with reference to the drawings.

FIG. 1 shows elements of a rack 1 which may also be referred to as load carrier. The rack 1 is embodied as roof rack. However, the configuration may also be used in a trunk of a vehicle or in the loading area of a pickup truck or rack body truck.

The rack 1 comprises a crossbar 10 and two load carrier feet 20 wherein only one load carrier foot 20 is shown in FIG. 1. The crossbar 10 comprises a crossbar member 100. The crossbar member 100 may be a full-length crossbar, i.e. a crossbar extending over the entire distance between two load carrier feet 20, or the crossbar member 100 may be a crossbar segment 100 as indicated in FIG. 1. More precisely, in the configuration as shown in FIG. 1, two crossbar segments 100 are provided to form the crossbar 10. Both crossbar segments 100 comprise the same length. Accordingly, the crossbar 10 is realized by means of two halves. It is, however, to be noted that crossbar segments with different lengths or a different number of crossbars may be used instead. The crossbar segments 100 are coupled to each other by means of a coupling member 200, 400 which will be described later in greater detail.

Figure 2:
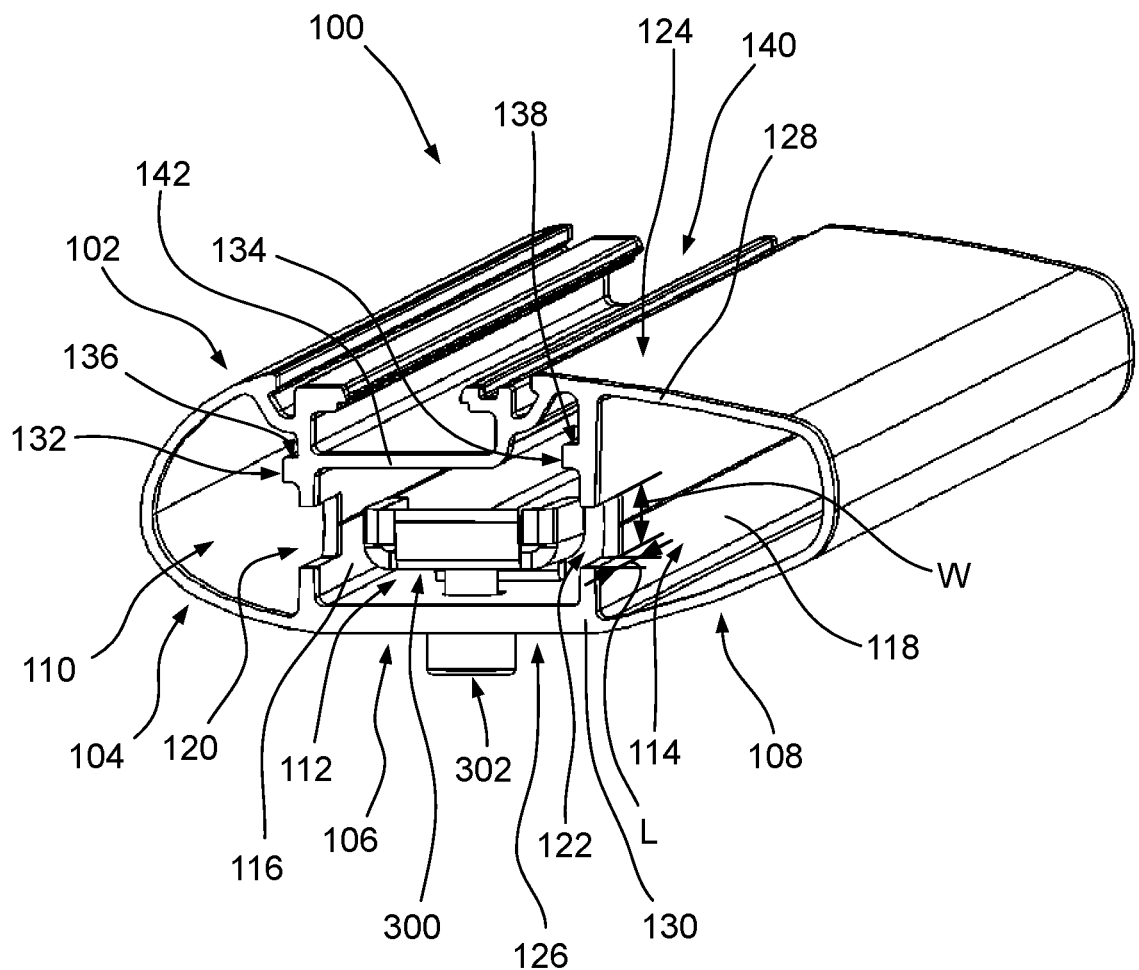
FIG. 2 shows a perspective view of an end portion of a crossbar member according to an embodiment.

FIG. 2 shows an end portion 102 of a crossbar member 100. The crossbar member 100 according to the embodiment is an aluminum profile which may preferably be manufactured by way of aluminum extrusion. The crossbar member 100 comprises an upper portion 124 and a lower portion 126. The upper portion 124 is configured to support loads to be transported thereon. The upper portion 124 may comprise a T-track 140 which may extend along the entire length of the crossbar member 100. The T-track is configured for receiving a fixation member that in turn may be used to fix accessories such as bike carriers or ski carriers to the crossbar member 100. However, the T-track is optional, and the crossbar segment may be implemented without such a T-track although T-tracks considerably enhance the mountability of accessories. Accessories may alternatively or in addition be clamped on the crossbar segment 100 by means of a clamp bracket contacting the lower portion 126 for clamping an accessory on the upper portion 124. The profile according to the embodiment is wing shaped and thus aerodynamically advantageously configured.

The crossbar member 100 according to the embodiment comprises three hollow portions 104, 106, 108. These portions may also be referred to as front hollow portion 104, middle hollow portion 106 and rear hollow portion 108 when taking the positions of the hollow portions during use of crossbar member 100 in a rack 1 mounted on a vehicle into account. In FIG. 2, the front hollow portion 104 corresponds to the left portion and the rear hollow portion 108 corresponds to the right portion. As is also shown in FIG. 2, the middle hollow portion 106 is provided between the front hollow portion 104 and the rear hollow portion 108 and can be located below the T-track 140. The middle hollow portion 106 and the T-track 140 may at least partially share a common wall 142 extending preferably in front rear direction of the crossbar segment.

Each of the hollow portions 104, 106, 108 extends in longitudinal direction of the crossbar segment 100. Each of the hollow portions 104, 106, 108 comprises an interior space 110, 112, 114. Adjacent interior spaces 110, 112, 114 of the hollow portions 104, 106, 108 are separated by common interior walls 116, 118. The common interior walls according to the embodiment provide an interior connection between the upper portion 124 and the lower portion 126, more precisely between an upper wall 128 and a lower wall 130. Accordingly, the interior walls 116, 118 function as reinforcing walls. The interior walls 116, 118 according to the embodiment are integral portions of the crossbar member 100, i.e. of the aluminum profile. As such, the interior walls 116, 118 may be extruded walls which are integrally formed with the upper portion 124 and the lower portion 126. In the embodiment, the interior walls 116, 118 are extruded over the entire length of the crossbar segment 100.

One interior wall 116 is, in front rear direction, arranged below a side wall of the T-track 140 and may, thus, be considered as continuation of a side wall limiting an interior space of the T-track 140. The other interior wall 118 is, in front rear direction, arranged at a distance from an opposite side wall limiting the T-track 140 so that a space is available between said T-track side wall and the interior wall 118.

In the end portion 102 of the crossbar segment 100, passages 120, 122 are provided. In the present embodiment, passages 120, 122 are formed by milling slots in the interior walls 116, 118. However, it is also possible to completely remove the interior walls in the end portion 102 or to not provide interior walls or omit the same in the end portion 102 when manufacturing the crossbar segment 100. The passages 120, 122 comprise a specific length L and width W. The passage dimension, in particular the Length L and Width W, may be chosen so as to allow the accommodation of a coupling member 200 which will be described later. According to a preferable embodiment, the length L in longitudinal direction of the crossbar member 100 is maximum 10% of the total length of the crossbar segment 100. According to a preferable embodiment, the width W is 50% or smaller than a total width of the interior wall 116, 118.

In an upper portion of the interior walls 116, 118, preferably near or at a level of a lower wall 142 of the T-track, an interior portion of the crossbar member (100) in the form of protrusions 132, 134 or engaging portions are provided. The protrusions 132, 134 provide a support and are engageable by a suitable means so as to apply a force thereon in a direction towards the lower portion 126 or to at least engage with the protrusions in a positive locking manner. The protrusions 132, 134 are coupled to the upper portion 124 and are integrally formed in the crossbar segment 100. More precisely, the protrusions 132, 134 are portions that are extruded when extruding crossbar segment 100. The protrusions 132, 134 may extend over the entire length of crossbar member 100 but may also be provided only in the end portion 102 of the crossbar member 100. In this way, the protrusions 132, 134 are available in regions where the passages 120, 122 are provided and may be used for applying a force on the same for urging the upper portion 124 towards the lower portion 126 in order to compensate any rigidity losses or structural strength losses in the profile due to the presence of the passages 120, 122. The protrusions 132, 134 comprise force receiving surfaces 136, 138 oriented towards the upper portion 124. Furthermore, the protrusions 132, 134 protrude in the same direction, more precisely in a rear-front direction of the crossbar member 100. Protrusion 132 is provided on an upper portion of interior wall 116 and protrusion 134 is provided on an upper portion of interior wall 118. Accordingly, protrusion 132 extends into interior space 110 and protrusion 134 extends in interior space 112.

An urging member 300 is arranged in the middle hollow portion 106. The urging member 300 is a plate-like element which is threadedly coupled to a tightening member 302 in the form of a tightening screw passed through an opening provided in the lower wall 130 of the crossbar member 100. The screw head is able to contact a surface portion around the opening and to be supported against the same when tightening the urging member 300. The urging member 300 may also be referred to as clamping member as its function is to clamp an inserted coupling member 200 against the lower wall 130 and against the protrusions 132, 134. By rotating the tightening member 302, a distance between urging member 300 and the lower wall 130 can be reduced for clamping a section of the coupling member between the lower wall 130 and the urging member 300.

Figure 3:
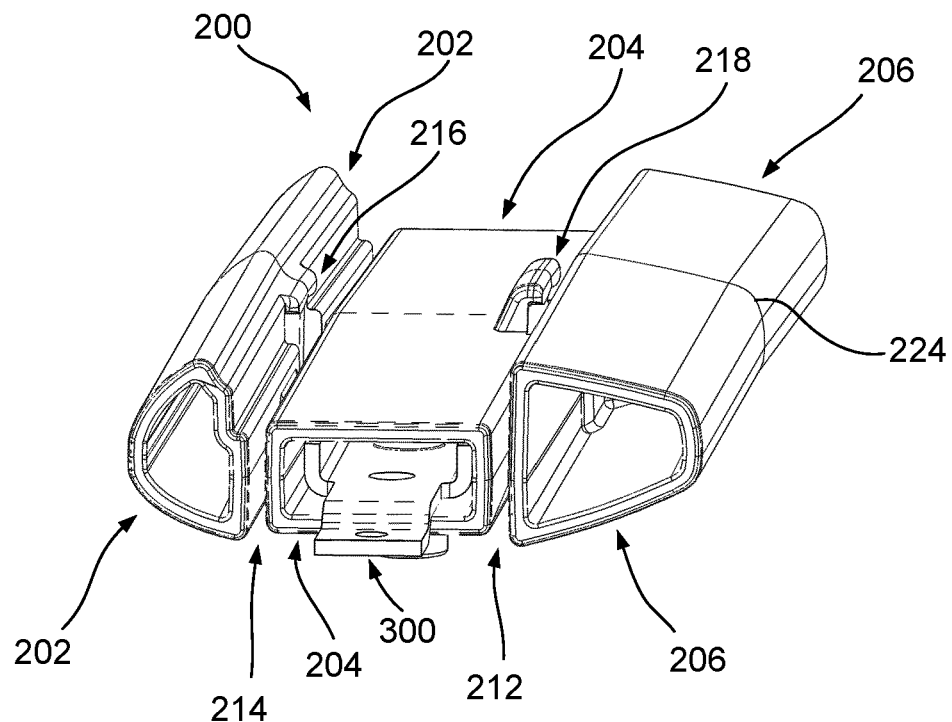
FIG. 3 shows a perspective view of a coupling member according to an embodiment.
Figure 4:
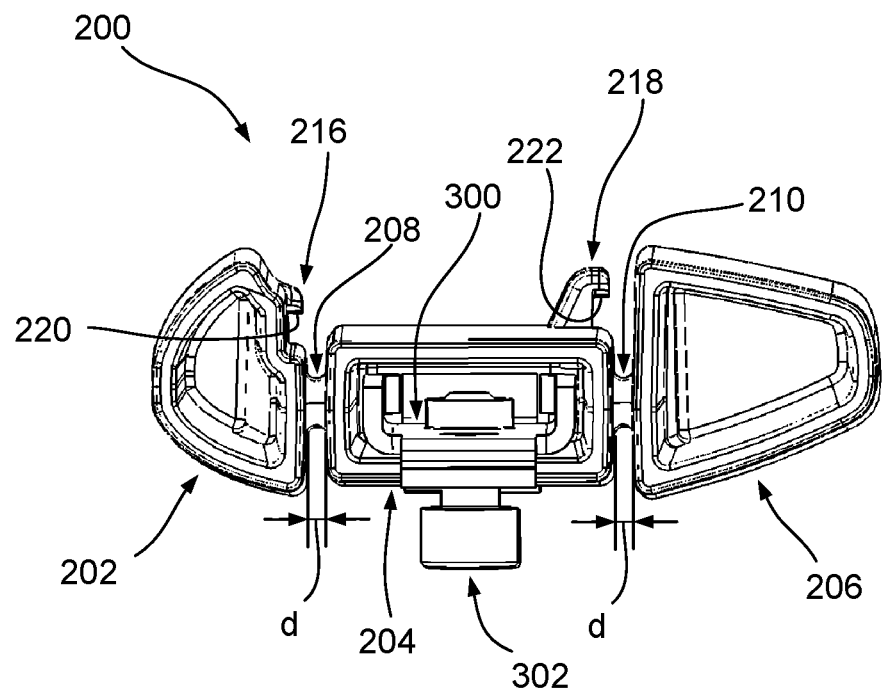
FIG. 4 shows a view in longitudinal direction of the coupling member of FIG. 3.
Figure 5:
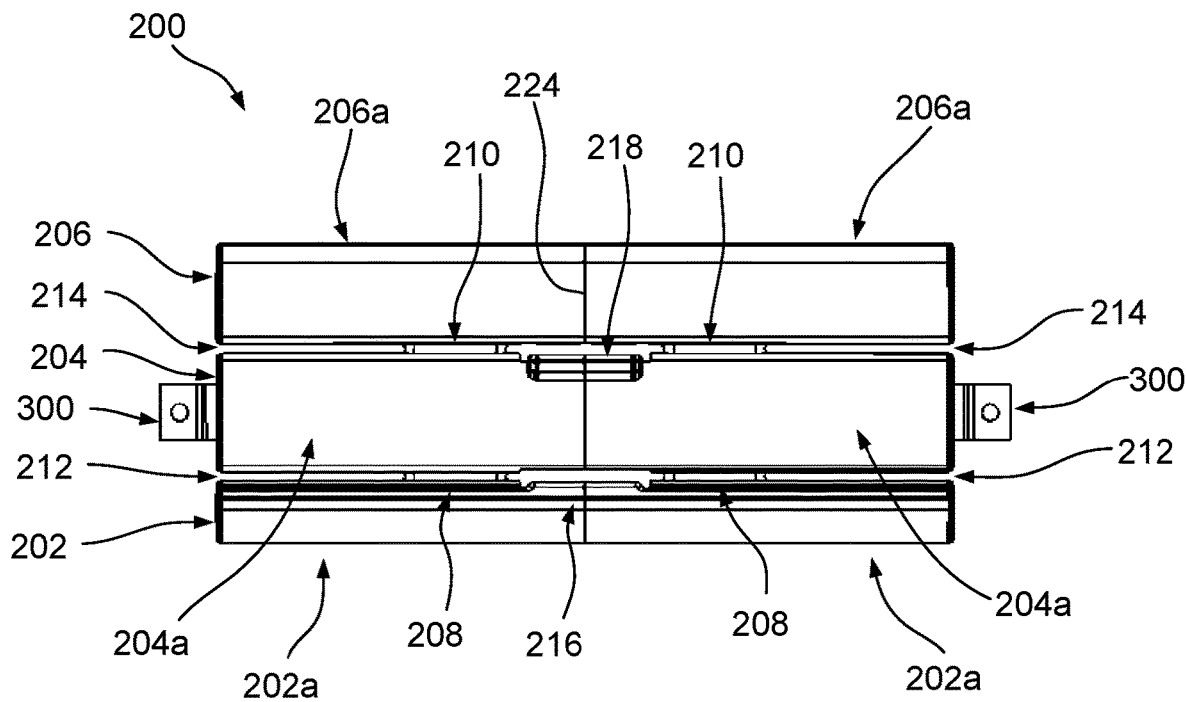
FIG. 5 shows a plan view of the coupling member according to FIG. 3.
Figure 6:
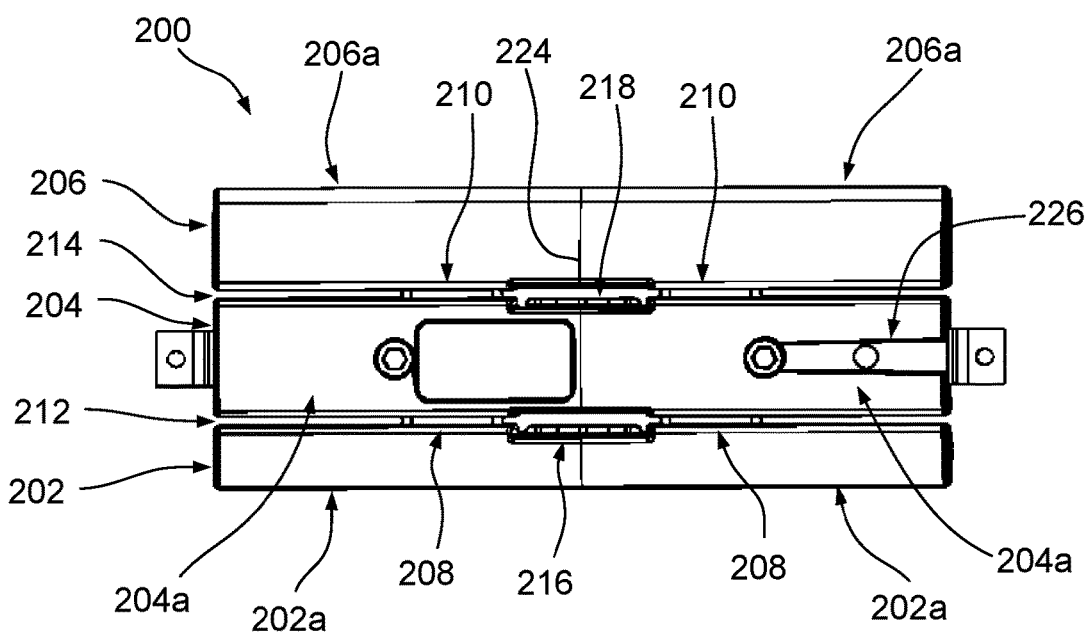
FIG. 6 shows a bottom view of the coupling member of FIG. 3.

A coupling member 200 insertable in the end portion 102 of the crossbar member 100 of FIG. 2 will be described with reference to FIGS. 3 to 6. FIG. 3 shows a perspective view of a coupling member 200. FIG. 4 shows a view in longitudinal direction of the coupling member 200. FIG. 5 shows a plan view of the coupling member 200 and FIG. 6 shows a bottom view of the coupling member 200. The coupling member 200 comprises three elongate coupling segments 202, 204, 206. The number of coupling segments is only exemplary and provided according to the number of interior spaces 110, 112, 114 provided in the crossbar member 100. The number may vary depending on the number of interior spaces to be filled with the elongate coupling segments.

The elongate coupling segments 202, 204, 206 at least partially have outer surface portions oriented towards each other or facing each other thereby forming a receiving space 212, 214 or channel between them. Each coupling segment 202, 204, 206 has an outer peripheral surface corresponding to inner surfaces of said crossbar member 100 limiting the interior spaces 110, 112, 114. The coupling segments 202, 204, 206 are formed matingly with the interior spaces 110, 112, 114, respectively, so that when inserted, they mate with and substantially fill the interior spaces 110, 112, 114 over a predetermined length. In other words, when the coupling member 200 is mounted in on the crossbar member 100 and the coupling segments 202, 204, 206 are inserted in the interior spaces 110, 112, 114, the coupling segments 202, 204, 206 are snugly fitted in the interior spaces 110, 112, 114. Corresponding to the hollow portions 104, 106, 108, the coupling segments may also be referred to as front coupling segment 202, a middle coupling segment 204 and a rear coupling segment 206.

The coupling segments 202, 204, 206 are coupled to each other by means of coupling portions 208, 210. The coupling portions 208, 210 hold adjacent coupling sections 202, 204, 206 at a predetermined distance d for forming the receiving space 212, 214 for accommodating the common interior walls of the crossbar member 100. Each of the elongate coupling segments comprises a cantilevered portion 202a, 204a, 206a insertable in the interior spaces. The cantilevered portions 202a, 204a, 206a extend from the above-mentioned coupling portion.

In the embodiment, the coupling portion 208, 210 is configured to be received in the passage 120, 122 defined in the end portion 102 of the crossbar member 100. The coupling portion 208, 210 acts as a stop limiting a movement or insertion of the elongate coupling segments 202, 204, 206 into the interior spaces 110, 112, 114. More precisely, the coupling member 200 can be configured such that the insertion of the coupling member 200 is possible up to a position in which the coupling portion 208, 210 abuts against a portion of the interior wall, for example a portion of the interior wall limiting the passage, a slot in the embodiment, in longitudinal direction.

The dimension of the coupling portion 208, 210 in longitudinal direction is smaller than the length L of the passage 120, 122. Thus, when the coupling portion 208, 210 is received in the passage 120, 122, a first longitudinal end portion of the coupling portion 208, 210 is in contact with the interior wall whereas an opposite second longitudinal end portion is arranged at a predetermined distance from the longitudinal end of the crossbar member 100. The height of the coupling portion 208, 210 is smaller than the height of the coupling segments it is coupled to.

The coupling member 200 further comprises two engagement portions 216, 218 that are configured as hook-like protrusions. The engagement portions 216, 218 are configured for an engagement with the above described protrusion 132, 134 or engaging portion formed inside the crossbar member 100. The engagement portions 216, 218 are configured to get in engagement with the supporting surfaces 136, 138 as described above and also referred to as force receiving surfaces so that they are able to apply a pushing force urging the upper portion of the crossbar member 100 towards the lower portion of the crossbar member 100. For that, contact surfaces 220, 222 configured to contact the supporting surfaces 136, 138 are provided on the engagement portions 216, 218. The contact surfaces 220, 222 are oriented downwards such that they face the supporting surfaces 136, 138 when the coupling member 200 is inserted in the crossbar member 100.

The engagement portions 216, 218 are provided at a longitudinal position adjacent to the coupling portion 208, 210 on an opposite side where the receiving space 212, 214 is formed. Accordingly, the coupling member 200 is configured such that the receiving space 212, 214, the coupling portion 208, 210 and the engagement portion 216, 218 are arranged in this order in longitudinal direction of the coupling member when starting from a free end of said cantilevered portion 202a, 204a, 206a and proceeding in longitudinal direction of the coupling member 200. In the embodiment, engagement member 216 is realized as a protrusion protruding from the front coupling segment 202 and integrally formed with the front coupling segment 202. The engagement member 218 is realized as a protrusion protruding from an upper portion of the middle coupling segment 204 and is integrally formed with the middle coupling segment 204 with an offset towards the rear coupling segment side.

Figure 7:
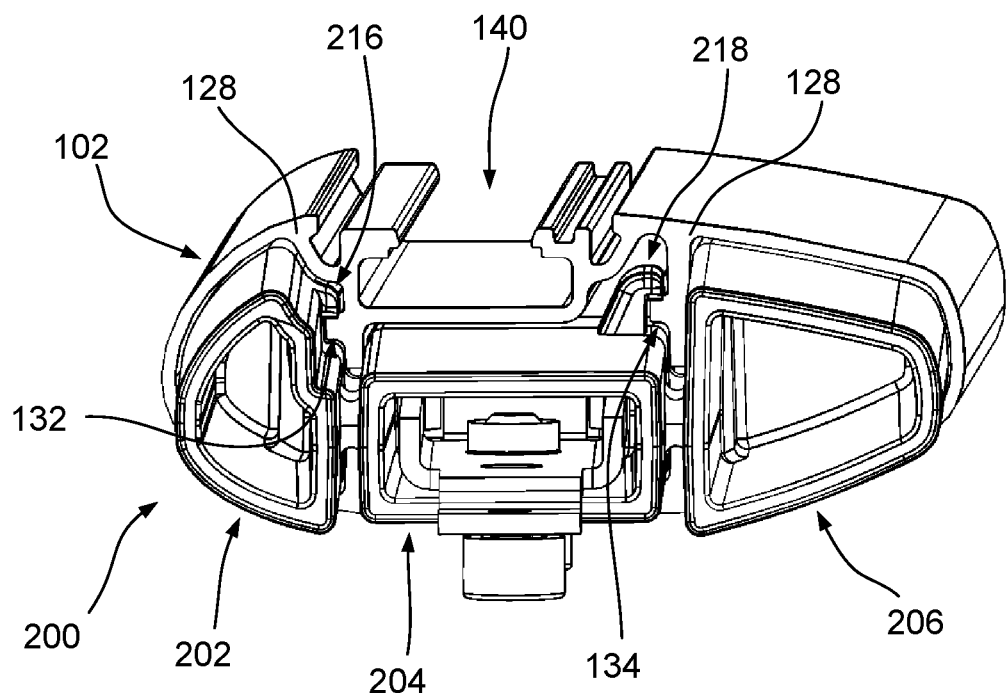
FIG. 7 shows a perspective view of a coupling member according to FIG. 3 inserted into a crossbar member.

FIG. 7 shows a perspective view of a coupling member 200 according to FIGS. 3 to 6 inserted into the end portion 100 of the above-described crossbar member 100. As is visible, the engagement portions 216, 218 are in contact with the protrusions 132, 134. In this way, the coupling member 200 is operatively coupled to the upper wall 128 at two positions, namely in front of and behind the T-track 140. Therefore, if the coupling member 200 is pushed towards the lower wall of the crossbar member, the upper wall 128 is pulled downwards.

Figure 8:
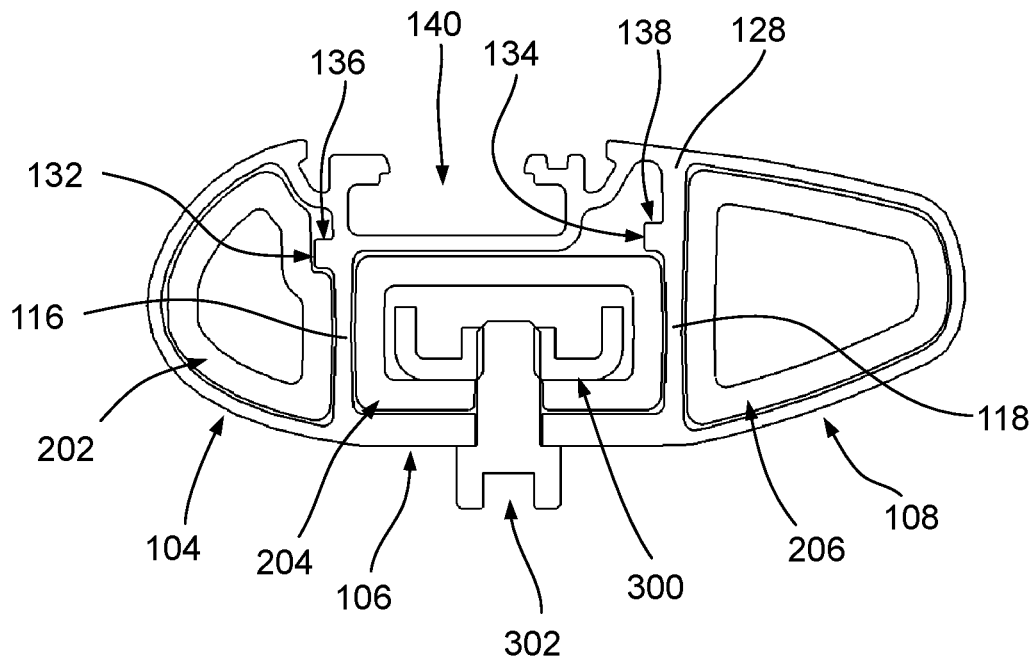
FIGS. 8 to 10 shown cross sectional views taken at different longitudinal positions through the arrangement shown in FIG. 7.
Figure 9:
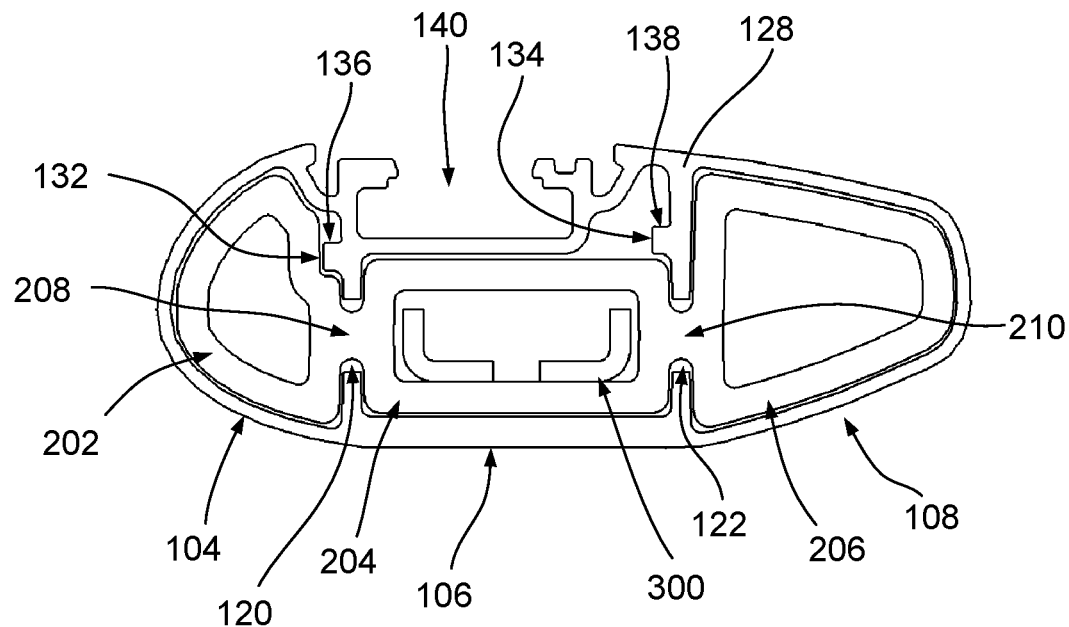
Figure 10:
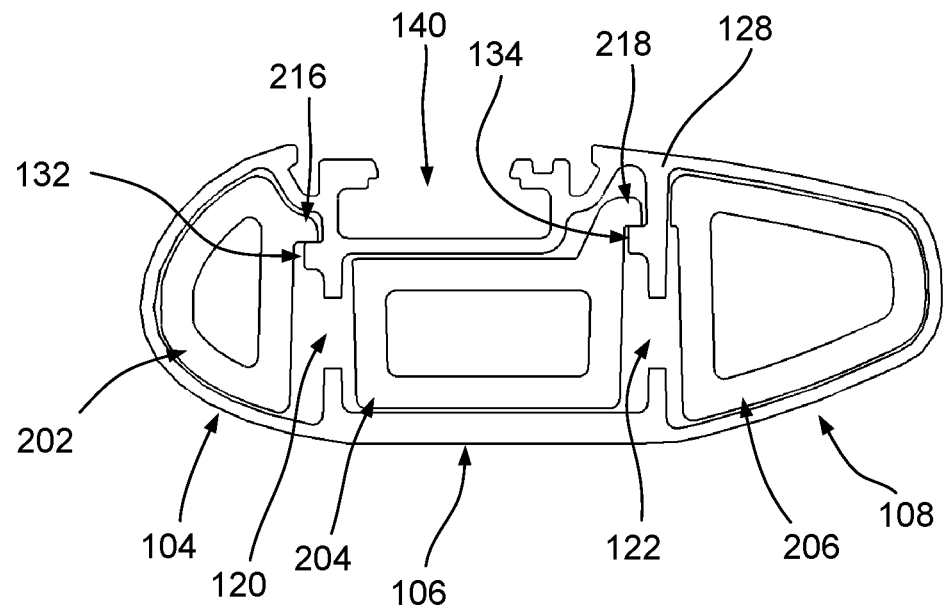

FIGS. 8 to 10 show different sectional views taken at different longitudinal positions in the end portion 102 of the crossbar member 100 with an inserted coupling member 200.

FIG. 8 shows a cross section through the crossbar member 100 and the coupling member 200 at a longitudinal position where the receiving spaces 212, 214 are arranged when the coupling segments 202, 204, 206 are inserted in corresponding interior spaces 110, 112, 114 and thus accommodated in the hollow portions 104, 106, 108. The urging member 300 is provided in the middle hollow portion 204 and is tightened by the screw 302 and therefore pushes the lower wall of the middle coupling segment 204 against the lower wall 130. Since the elongate coupling segments 202, 204, 206 are coupled to each other by means of the coupling portions 208, 210, all coupling segments 202, 204, 206 are pushed against the lower inner walls of the hollow portions 104, 106, 108 so that the coupling member 200 is securely coupled to the crossbar member 100. As is also visible in FIG. 8, the interior walls 116, 118 are received in the receiving spaces 212, 214 and although protrusions 132, 134 with supporting surfaces 136, 138 are provided near the upper wall 128 and the T-track 140 at this position, there is no engagement between the protrusions 132, 134 and the coupling member 200 at this longitudinal position.

FIG. 9 shows a cross section taken at a longitudinal position at which the coupling portions 208, 210 and the passages 120, 122 are located when the coupling portions 208, 210 are fully inserted into said passages 120, 122. At this location, the coupling member 200 is formed continuously. Again, there is no engagement between the protrusions 132, 134 and the coupling member 200 at this longitudinal position. However, as is visible from FIG. 9, the coupling portions 208, 210 are provided in the passages 120, 122.

FIG. 10 shows a cross section at a longitudinal position at which the engagement portions 216, 218 are located and in contact with the protrusions 132, 134 when the coupling member 200 is fully inserted in the end portion 102. At this position, there is no coupling portion 208, 210 and nothing is provided in the passages 120, 122. Since the engagement portions 216, 218 are in engagement with the protrusions 132, 134, a structural weakness existing due to the passages 120, 122 in the interior walls is compensated.

In FIGS. 3 to 6, the urging member 300 as described before in connection with the crossbar member 100 is shown in a condition in which it is inserted in or received in the middle hollow portion 204 of the coupling member 200. In order to allow an easier insertion of the coupling member 200 into the end portion of a crossbar member 100, a slot 226 may be provided in a lower portion of the coupling member 200 as is shown in FIG. 6. The slot 226 is configured to receive the tightening member 302 as described before and may be provided instead of an opening for passing the tightening member into the coupling member 200. Accordingly, the coupling member can be inserted into the crossbar segment without the need to remove the tightening member 302.

Figure 11:
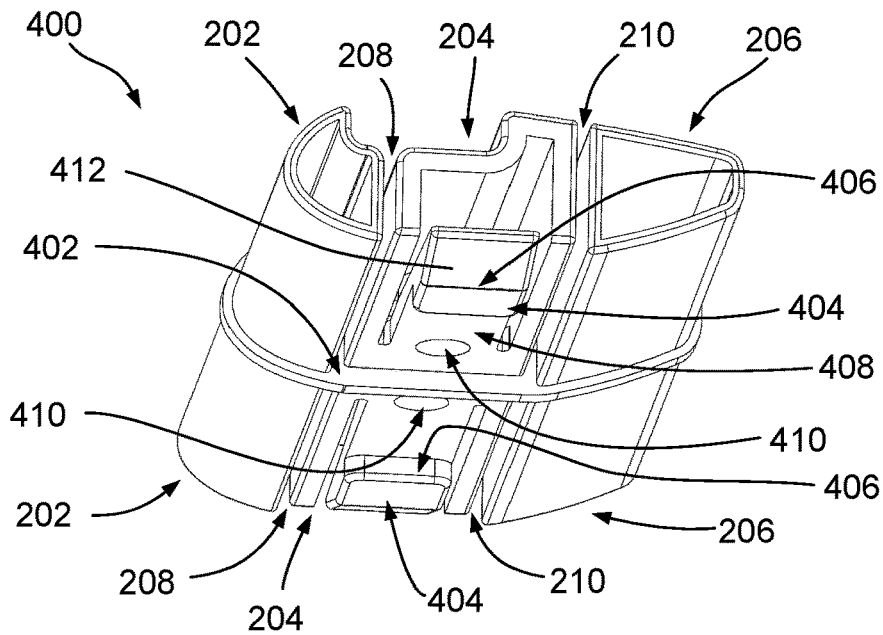
FIG. 11 shows a perspective view of a coupling member according to modification.
Figure 12:
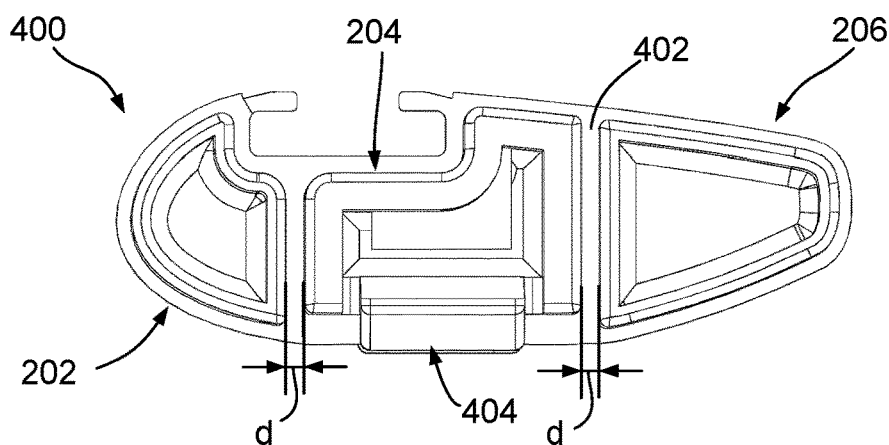
FIG. 12 shows a view in longitudinal direction of the coupling member of FIG. 11.

FIGS. 11 and 12 show a modification of the above described coupling member 300. The modified coupling member 400 comprises a self-locking capability so that it automatically engages with a crossbar member in which it is inserted. The coupling member 400 can be configured for a positive locking coupling with the crossbar member. The coupling member 400 comprises an engaging portion 404 configured to engage with, preferably snap into, a receiving portion which may be formed in the crossbar member. The engaging portion 404 can comprise a protrusion 406 and the receiving portion can comprise a recess or vice versa. The protrusion 406 is arranged movable and operable by a user so as to disengage the engaging portion from the receiving portion when the coupling member is to be separated from the crossbar member. The protrusion 406 is movably held on the middle portion 204 by means of flexible lever portion 408. An opening 410 for inserting the above-mentioned tightening member is also provided on the lower portion of the middle portion 204. The coupling portion 402 according to the modification is not arranged between outer peripheral portions of the elongate coupling segments but couples the coupling segments at longitudinal ends thereof. The coupling member 400 is configured symmetrically with respect to the coupling portion 402 which is configured as a wall like portion. Other features of the coupling member 400 are identical to the features described with respect to the coupling member 200.

Figure 14:
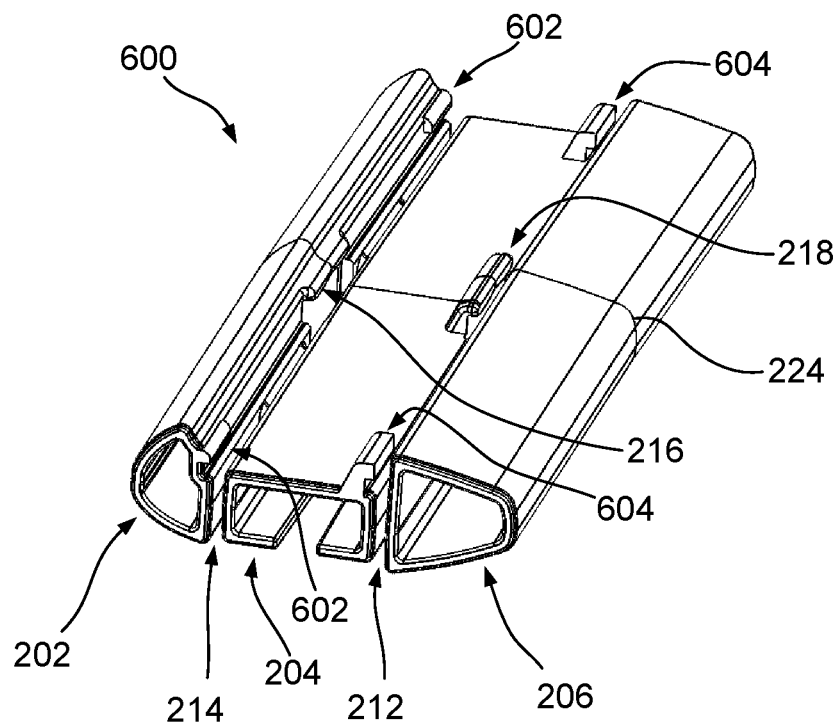
FIG. 14 shows a modification of the coupling member shown in FIGS. 3 to 6.

FIG. 14 shows a modification of the coupling member 200 as shown in FIGS. 3 to 6. The coupling member 600 differs from the coupling member 200 as described above only in that it comprises additional engagement portions 602, 604 in addition to the engagement portions 216, 218. The additional engagement portions 602, 604 are provided at free ends of the coupling segments 202, 204 and are thus configured to be engaged with the protrusions 132, 134 at a predetermined distance from the engagement portions 216, 218. In this way, multiple engagements between the upper portion of the crossbar member and the coupling member can be realized enhancing the stability of the structure even if for example interior reinforcing walls are omitted as for example shown in FIG. 15. In particular if the coupling member is clamped against the lower portion of the crossbar member, the upper portion is coupled to the lower portion of the crossbar member due to the engagement of the coupling member with the upper portion so that the coupling member can form a rigid connection between upper and lower portion as a substitute for a missing interior reinforcing wall between upper and lower portion.

Figure 15:
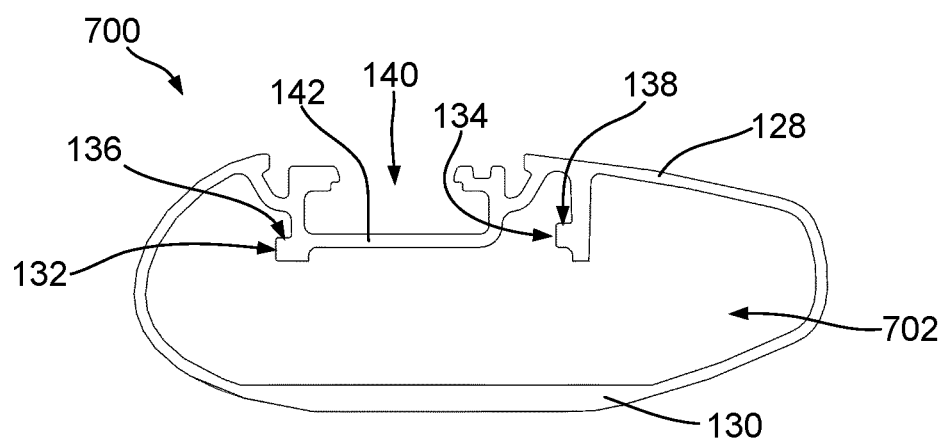
FIG. 15 shows a cross section of a crossbar member.

FIG. 15 shows a cross section of a crossbar member 700 which is a modification of the crossbar member 200 as shown in FIG. 2. The configuration of the crossbar member 700 differs from the configuration of crossbar member 200 in that there are no interior walls 116, 118 connecting the upper portion or wall with the lower portion or wall of the crossbar member. However, the engagement portions 132, 134 providing force receiving or supporting surfaces 136, 138 are provided allowing a proper engagement of an inserted coupling member with the engagement portions. Preferably, a coupling member used in connection with the crossbar member 700 of FIG. 15 comprises multiple engagement portions 216, 218, 602, 604 so that the upper portion or upper wall 128 can be coupled to the coupling member at multiple positions. Thus, an inserted coupling member can add additional rigidity and stability to the crossbar member, in particular if the inserted coupling member is clamped against the lower wall 130 of the crossbar member 700.

Figure 16:
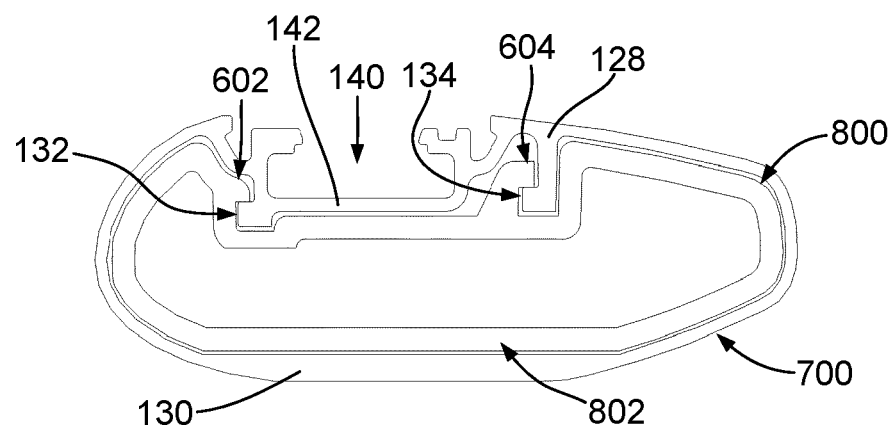
FIG. 16 shows a cross section of the crossbar member of FIG. 15 with an inserted coupling member.

FIG. 16 shows a cross section of the crossbar member of FIG. 15 with an inserted coupling member 800. Coupling member 800 differs from coupling member 600 as shown in FIG. 14 in that only one elongate coupling segment 802 is provided and inserted into crossbar member 700. The elongate coupling segment 802 forms an inner profile which is formed matingly with crossbar member 700 forming an outer profile. In other words, the outer contour of the inner profile of the coupling member 800 substantially follows an inner contour of the outer profile of the crossbar member 700. The coupling segment 802 comprises multiple engagement portions similar to the ones on coupling member 600 of FIG. 14 and including engagement portions 602, 604 at a free end of the coupling segment. All engagement portions of the coupling segment are engaged with the engaging portions 132, 134 in the crossbar member 700 thereby coupling an upper portion of the crossbar segment 700 to an upper portion of the coupling member 800. Although not shown, an urging member 300 as described before may be provided in the interior space 702 and in the hollow elongate coupling segment 802 for pushing the lower wall of the coupling segment 802 against the lower wall of the crossbar member 700.

Figure 17:
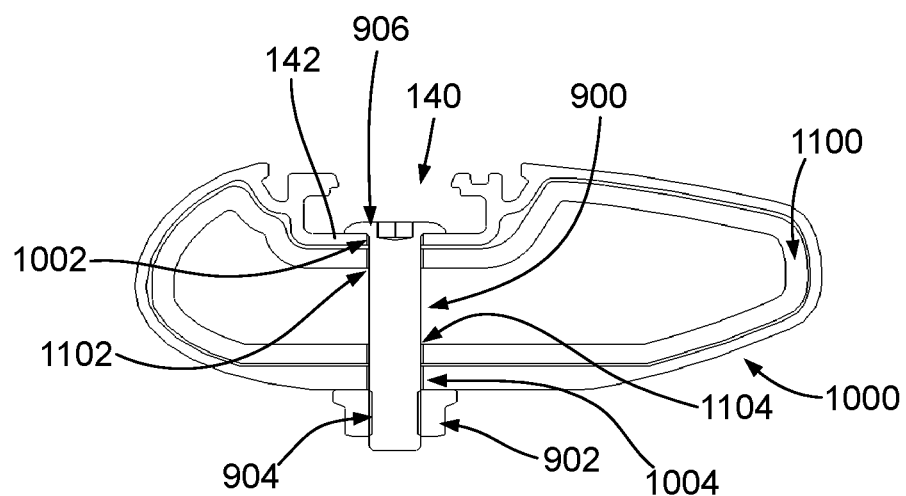
FIG. 17 shows a cross section of a crossbar member with an inserted coupling member and a possible way of coupling both elements to each other.

FIG. 17 shows a cross section of a crossbar member 1000 with an inserted coupling member 1100 and a possible way of coupling both elements to each other. In this configuration, the crossbar member 1000 is not configured for a direct engagement with the coupling member as in all of the embodiments described before. The crossbar member 1000 does not comprise engagement portions and the coupling member does not comprise engaging portions. Instead, the crossbar member 1000 is coupled to the coupling member 1100 by means of a fixation member 900 embodied as a bolt. The fixation member 900 is passed through an opening 1002 formed in a lower wall 142 of a fixation profile 140 embodied as a T-track as well as through openings 1102, 1104 provided in upper and lower wall portions of the coupling member 1100 and through an opening 1004 in a lower wall portion of the crossbar member 1000. A nut 902 is tightened on a threaded end portion 904 of the fixation member 900. The bolt head 906 is supported on lower wall 142 and is fully accommodated in the fixation profile 140. In this way, a relative movement between coupling member and crossbar member 1000 in longitudinal direction is prevented by positive locking. The nut may also be tightened such that the crossbar member 1000 exerts a pressing force on the coupling member 1100 such that both elements are coupled in a press fit manner. Although not shown, a fixation by means of a fixation member 900 as described before may suitably be provided and used with all other crossbar members and coupling members as described in the specification, in particular also in addition to the direct engagement between coupling member and crossbar member as described herein.

Figure 13:
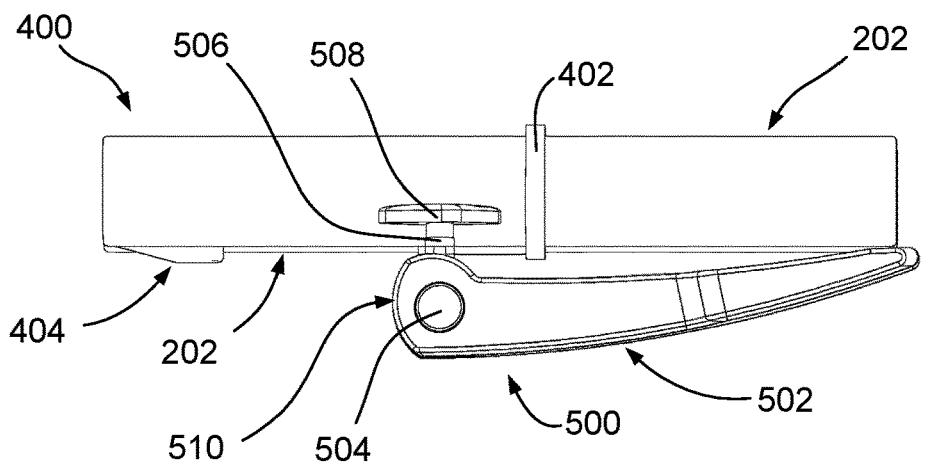
FIG. 13 shows a coupling member according to a further modification.

Instead of the urging member 300 and tightening member 302 an alternative tightening configuration 500 may be used as shown in FIG. 13. In this configuration, the tightening member 506 may be a shaft or bolt coupled to a hand operable locking member 502 which in this alternative is exemplified as a tightening lever 502. The tightening member 506 is coupled to an urging member 508 provided in said coupling member similar to the above-mentioned urging member 300. The tightening member 506 is coupled to the urging member 508 at one end and is coupled to a pivot pin 504 at its other end. The tightening lever 502 comprises a support surface 510 which is configured to get in contact with the outer surface of the lower portion of the crossbar member. Thus, the tightening lever 502 is configured to rest on the outer surface of the crossbar member in a tightened state. The support surface 510 is formed as a cam surface with varying distance from a pivot axis defined by the pin 504. When the tightening lever 502 is in an opened state, the distance between a support surface section facing the outer surface of the crossbar member and the pivot axis is smaller compared to the state where the tightening lever is in a closed stated. Accordingly, the rotation of the tightening lever 502 changes the distance between a support surface section facing the urging member and the urging member so that a movement of the tightening lever 502 while being supported on an outer surface of the crossbar member leads to a clamping movement of the urging member towards and away from the lower portion of the crossbar member. By using a tightening mechanism as described before, a quicker and rattle free attachment of crossbar segments can be achieved. In particular, a play between the members may be removed.

While in the above embodiments, three hollow portions 104, 106, 108 were described, it is noted that the crossbar member may be configured with two hollow portions or with more than three hollow portions. The coupling member may then comprise a corresponding number of coupling segments.

Although not shown, the crossbar segments 100 can also be coupled to the load carrier feet 20 by means of a coupling member similar to the ones described before. It is noted that the functional principle of the coupling member 200, 400 as described above may also be used for the coupling member for coupling a crossbar member to a load carrier foot 200. It is obvious from the drawings that the coupling members described above comprise a configuration which is substantially symmetrical to a middle portion 224, 402 or a middle plane extending perpendicular to a longitudinal direction of the coupling members 200, 400 as for example shown in FIGS. 3, 5, 6 and 11. When providing a coupling member for fixing a crossbar member 100 to the load carrier foot 20, such a coupling member may be configured to comprise only one half of such a symmetrical arrangement as if the coupling member would be cut in two halves at the middle portion 224, 402.

A further configuration according to an embodiment will be described with reference to FIGS. 18 to 22. While in the following a safety mechanism will be described which is accommodated in a crossbar member, it is noted that such a safety mechanism may also be provided in a coupling member. A crossbar member 100 may be provided which may comprise one or more features as already described before. In particular, the crossbar member can be formed by a closed profile comprising at least one hollow portion 106 extending in longitudinal direction of the crossbar member 100 and comprising an interior space 112 for at least partially receiving the coupling member 200 therein.

The crossbar member comprises a safety mechanism 1200. The safety mechanism 1200 is configured to actively force a user to correctly interlock the coupling member and the crossbar member for properly fixing the crossbar member 100 to the coupling member 200. In particular, the safety mechanism is configured such that the user is required to perform a locking operation during mounting the crossbar member 100 to the coupling member 200. For that, the safety mechanism 1200 can be configured to actively displace the crossbar member 100 inserted on the coupling member 200 away from a predetermined locking position on the coupling member 200. In this way, the crossbar member 100 and the coupling member 200 are wrongly positioned with respect to each other if both elements are not interlocked with each other and a user stops applying an insertion force in an insertion direction on the members.

The locking mechanism 1200 may comprise an urging portion 1202 for applying a force on the coupling member 200 in a direction urging the coupling member 200 and the crossbar member 100 away from each other. In other words, correctly positioning the crossbar member 100 on the coupling member 200 as to be carried out against a predetermined urging force.

Figure 18:
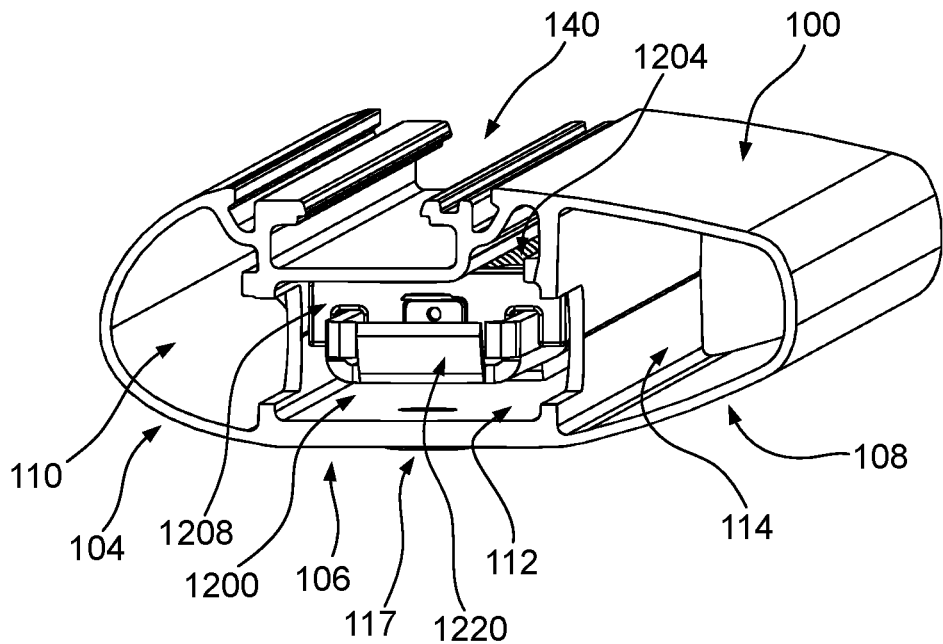
FIG. 18 shows an alternative configuration of crossbar member, more precisely an end portion of a crossbar member.
Figure 19:
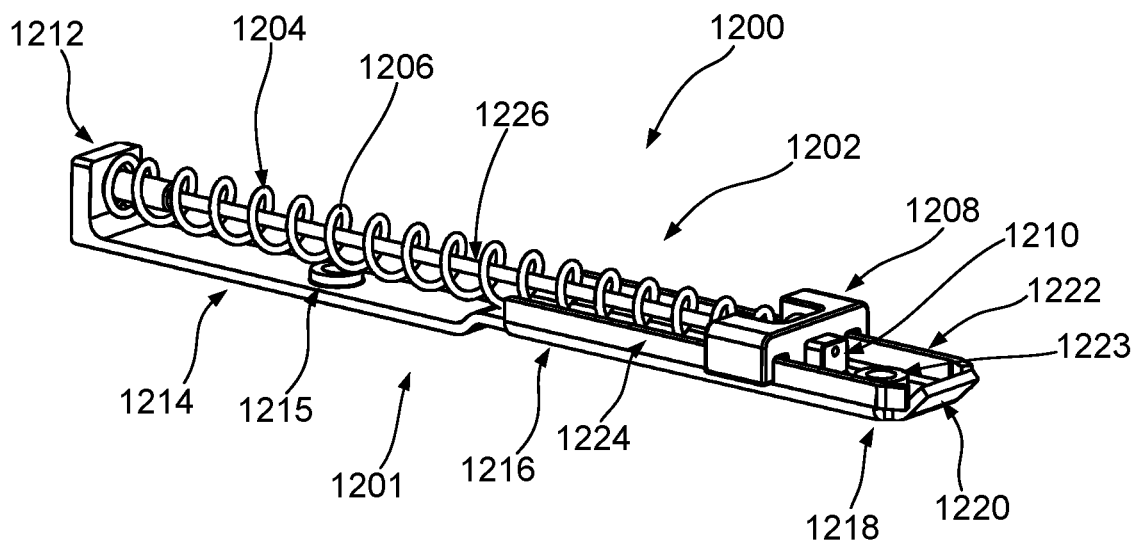
FIG. 19 shows a safety mechanism usable in crossbars or coupling members.
Figure 20:
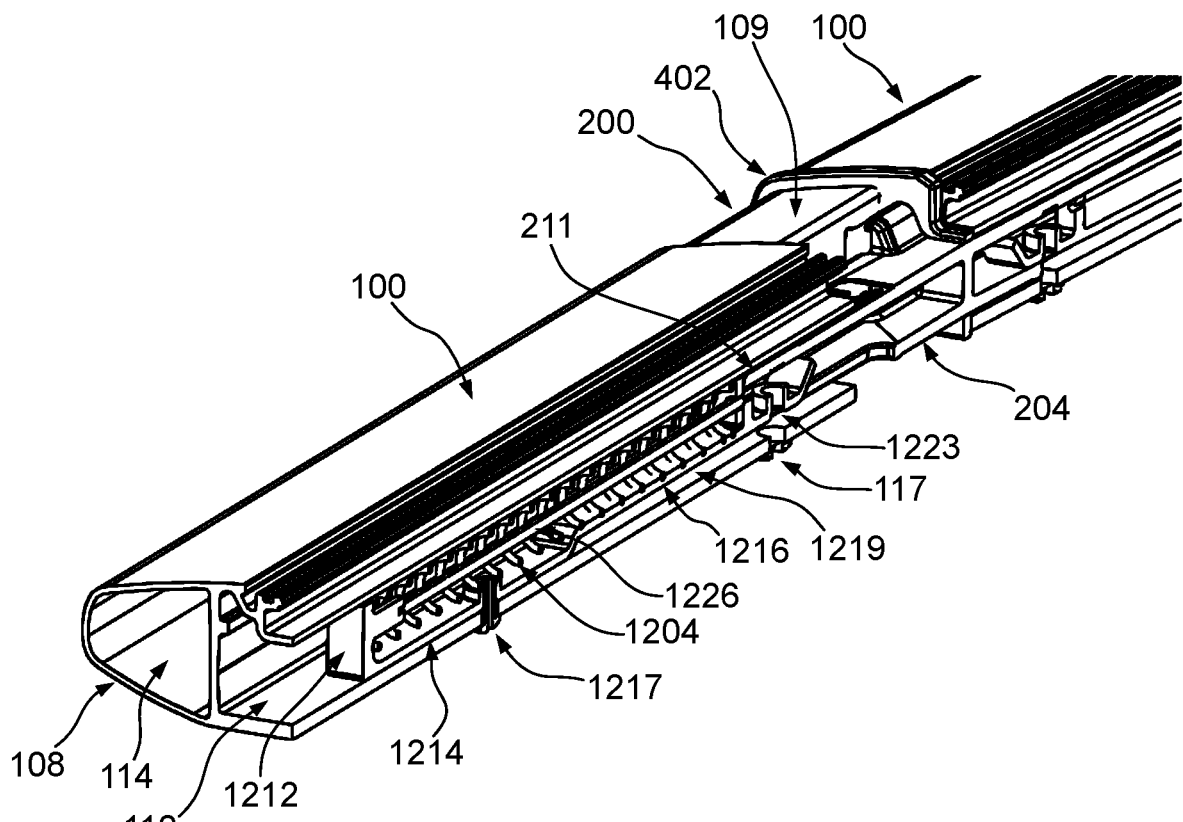
FIG. 20 shows a cross sectional view of two crossbar members and a coupling member, wherein a crossbar member is partially inserted on the coupling member.
Figure 21:
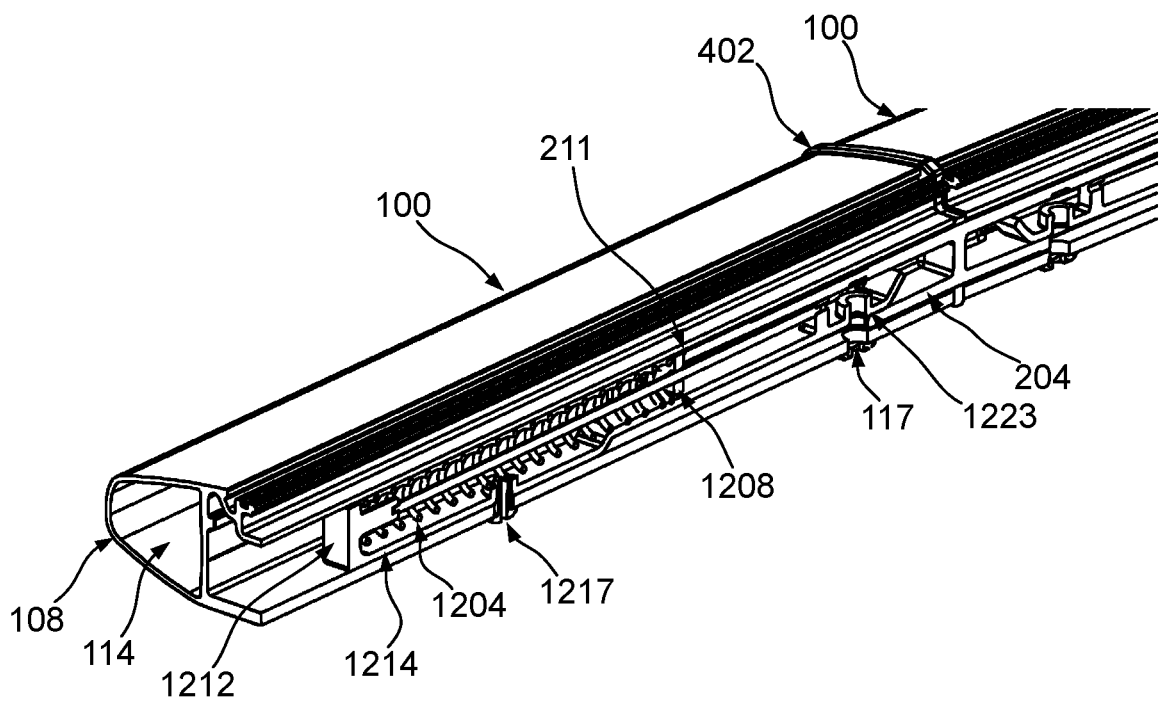
FIG. 21 shows a cross sectional view of two crossbar members and a coupling member with the partially inserted crossbar member of FIG. 20 now being fully inserted on the coupling member.

The urging portion 1202 comprises an urging member 1204 which in the present embodiment comprises a coil spring 1206. Other elastic members may be used instead of the spring 1206. The coil spring 1206 is arranged so as to extend in longitudinal direction of the crossbar member 100. In the embodiment, the coil spring 1206 is guided on an elongate guiding member 1226 which may be embodied as a rod or wire mounted between a forward support 1210 and a rear support 1212. An abutment portion 1208 is provided with the elongate guiding member 1226 passing therethrough. The abutment portion 1208 is arranged between a forward end portion of the spring 1206 and the forward support 1210 and is urged towards the forward support by the spring 1206. In other words, the abutment portion 1208 is prebiased towards the forward support 1210. In the embodiment, the forward support 1210 and the rear support 1212 are arranged on a receiving portion 1201 which may be configured like one of the later described receiving portion 1400. The receiving portion 1201 may comprise a fixation portion 1214 and an engagement portion 1216. In the embodiment, the receiving portion 1201 is integrally formed from cutting and bending a sheet metal. The fixation portion 1214 is configured as a substantially flat portion with a fixation opening 1215. The fixation portion 1214 is configured to get in contact with an interior surface portion of the crossbar member 100. In the embodiment of FIG. 18, the fixation portion 1214 is fixed to the crossbar member 100 by means of the fixation opening 1215 and a threaded bolt 1217 as is shown in FIGS. 20 and 21. The engagement portion 1216 continues from the fixation portion 1214 in longitudinal direction of the receiving portion 1201. The engagement portion 1216 is coupled to the fixation portion 1214 at a first end portion with a step so that the engagement portion 1216 is offset with respect to the fixation portion 1214. Accordingly, if the fixation portion 1214 is fixedly coupled to a crossbar member the engagement portion 1216 is held or extends at a distance from a wall portion of the crossbar member 100 to which the fixation portion 1214 is coupled. In this way, a receiving space 1219 may be provided between the engagement portion 1216 and a wall portion of the crossbar member 100 as is shown in FIG. 20. FIG. 20 shows an arrangement in which the receiving portion 1214 is fixedly mounted on a lower wall portion of a crossbar member 100 by means of a bolt 1217, more precisely in a portion below the fixation profile 140. At a second end portion, a receiving opening 1223 is provided. The second end portion may also be referred to as forward end portion. The receiving opening 1223 is configured to receive a tightening member, such as the tightening member 302 as described before. The receiving opening 1223 may be an opening, for example a threaded opening and the tightening member may be a screw or threaded bolt inserted into said crossbar member 100 from below through an opening 117. Accordingly, at least a forward end portion 1220 of the receiving portion 1201 or a major part of the receiving portion 1201 may form a clamping member or urging member 300 as described before. The engagement portion 1216 according to the embodiment further comprises guide walls 1222, 1224 on opposite lateral sides for guiding the abutment portion 1208.

The function of the safety mechanism 1200 will be described with reference to FIGS. 20 to 22. FIG. 20 shows a state in which the crossbar member 100 having such safety mechanism 1200 is partially inserted on the coupling member 200. In this state, an end portion 211 of an elongate coupling segment 204 is in contact with the abutment portion 1208 so that a further movement of the crossbar member 100 in insertion direction can only be carried out against an urging force of the urging member 1204. As is also indicate in FIG. 20, the coupling member comprises a colored portion 109, for example colored in red. The colored portion is a portion of an outer circumferential surface 109 of an elongate coupling segment of the coupling member 200. The colored portion 109 is visible to a user as long as the crossbar member 100 is not correctly inserted on the coupling member 200.

Figure 22:
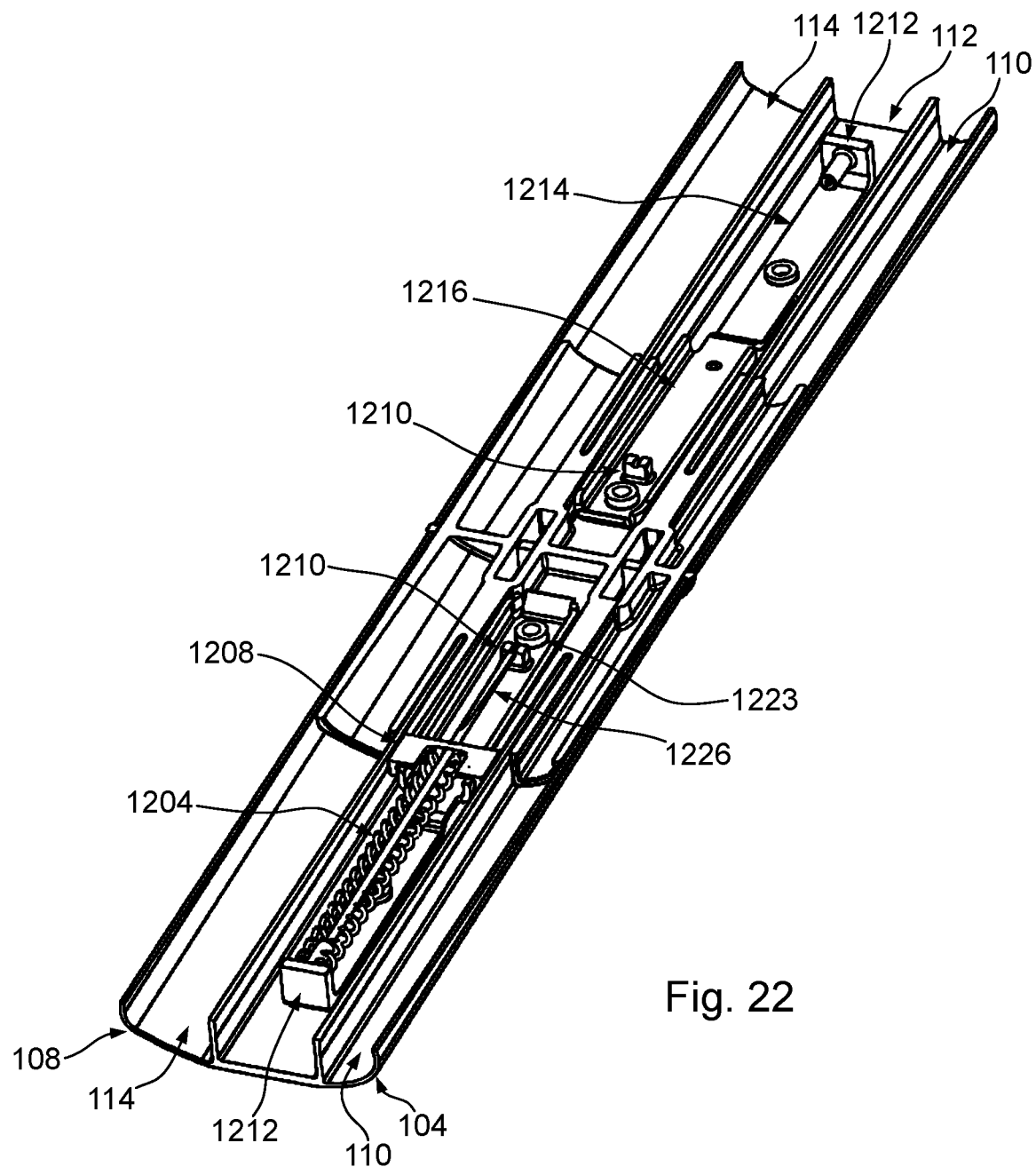
FIG. 22 shows a cross sectional view of the arrangement of FIG. 21 with a sectional plane in cross direction and perpendicular to the sectional plane in FIG. 22.

FIGS. 21 and 22 show a state in which the crossbar member 100 is correctly positioned on the coupling member 200, in other words fully inserted on the coupling member 200. In this state, the urging member 1204 is compressed and exerts an urging force on end portion 211 via the abutment portion 1208. Accordingly, a user has to hold the coupling member and the crossbar member in this state and application of a force and the crossbar member 100 would be displaced from the correct position if the user released the crossbar member. The compressed urging member 1204 would in this case move the crossbar member 100 in detaching direction which in turn would uncover the colored portion 109 indicating that the crossbar member is not correctly positioned to a user. If the crossbar member 100 is correctly fixed to the coupling member by engaging a tightening member with the receiving opening 1223, the crossbar member 100 is correctly held on the coupling member 200 wherein the colored portion remains concealed or covered by the crossbar member 100.

Figure 23:
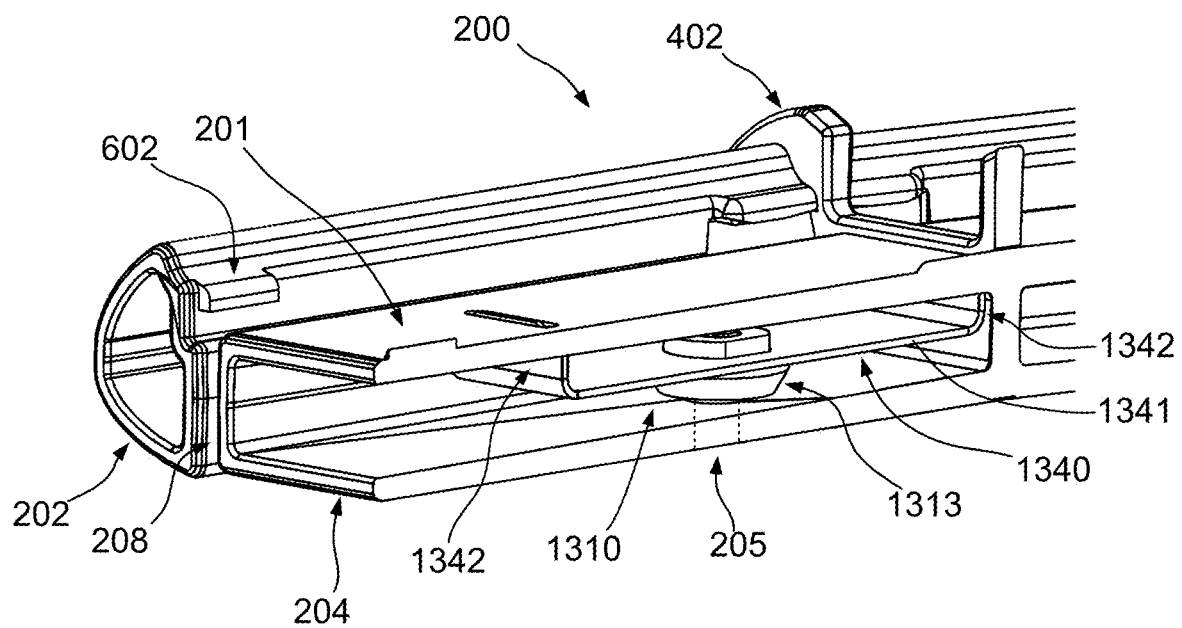
FIG. 23 shows a cross sectional view of a coupling member according to an embodiment.

FIG. 23 shows a cross sectional view of a coupling member 200 according to an embodiment. The coupling member 200 may be similar to the coupling member 200 or other coupling members described before but differs in that it comprises a specific locking mechanism 1300 for locking the coupling member to a crossbar member 100.

Figure 36:
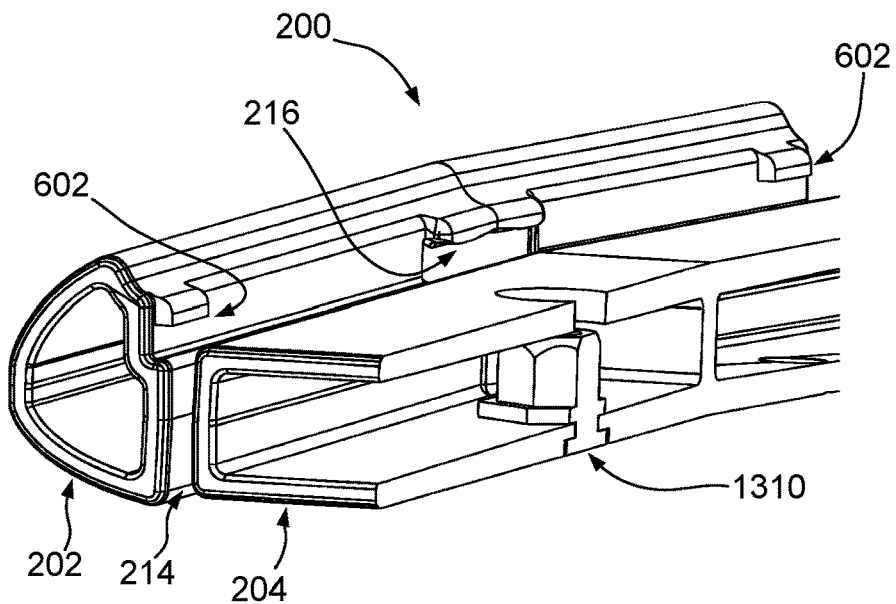
FIG. 36 shows a further exemplary embodiment of a coupling member in longitudinal sectional view, in particular relating to the use of a different kind of actuating portion.

The locking mechanism 1300 may comprise an actuating portion 1310. The actuating portion 1310 may be engageable with a corresponding receiving portion 1400 which forms a mating counterpart. Generally, the actuating portion 1310 may be a member movable with respect to the lower wall portion of an elongate coupling segment (see FIG. 23) or may be integrated in a lower wall portion of an elongate coupling segment 204 (see FIG. 36). Possible configurations of an actuating portion 1310 are shown in FIGS. 23 and 36. Possible configurations of a receiving portion 1400 are shown in FIGS. 24, 26, 28 and 37.

In the embodiment of FIG. 23, the actuating portion 1310 is movably held on a spring mechanism 1340. As an example, a plate spring 1341 is shown in FIG. 23. The plate spring 1341 is mounted to an upper wall of elongate coupling segment 204. While plate spring 1341 is coupled to the upper wall at two fixing portions 1342, it is noted that an alternative configuration is possible in which the plate spring is mounted to the coupling member at one end and comprises a free end in which the actuation portion is provided. The coupling member 200 comprises an opening 205 in a lower wall portion of the elongate coupling segment 204. A force transfer member, for example a rod or bolt, may be passed through such an opening 205 and engaged with the actuating portion 1310. Thus, by applying a force on the force transfer member, the actuating portion may be moved against a spring force exerted by the spring mechanism.

Figure 25:
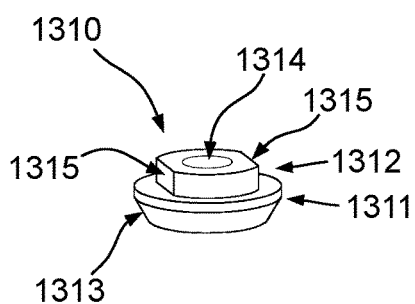
FIG. 25 shows a perspective view of an exemplary actuating portion usable in the coupling member shown in FIG. 23.

FIG. 25 shows a possible configuration of an actuating portion 1310. The actuating portion 1310 may comprise an engaging portion 1311 configured to engage with the before mentioned receiving portion 1400 on a crossbar member 100. The engaging portion 1311 may comprise a tapering portion tapering towards a forward end of the engaging portion 1311. The engaging portion 1311 may be a conical engaging portion 1313 Configured to be inserted into the receiving portion 1400, for example into a receiving opening 1423 formed in the receiving portion 1400.

The actuating portion 1310 may further comprise a coupling portion which may be embodied as a threaded opening 1314. The threaded opening 1314 may extend along a central axis and may be configured to be coupled to a force transfer portion 1330. The actuating portion 1310 may further comprise a supporting portion 1312 configured for non-rotatably supporting the engaging portion 1311 on the spring mechanism 1340. The supporting portion 1312 may at least partially comprise a non-circular outer circumferential surface, for example with at least one plane surface area 1315. If such a supporting portion 1312 is inserted in a correspondingly formed opening in the spring mechanism 1340, a rotation about a central axis of the actuating portion 1310 with respect to spring mechanism 1340 is prevented. In this way, a movement of the actuating portion 1310 in an extension direction of its central axis may be effected by a movement of a force transfer member 1330 threadedly engaged in the threaded opening 1314 for example a rotational movement of the force transfer member or a longitudinal movement of the force transfer member.

Figure 24:
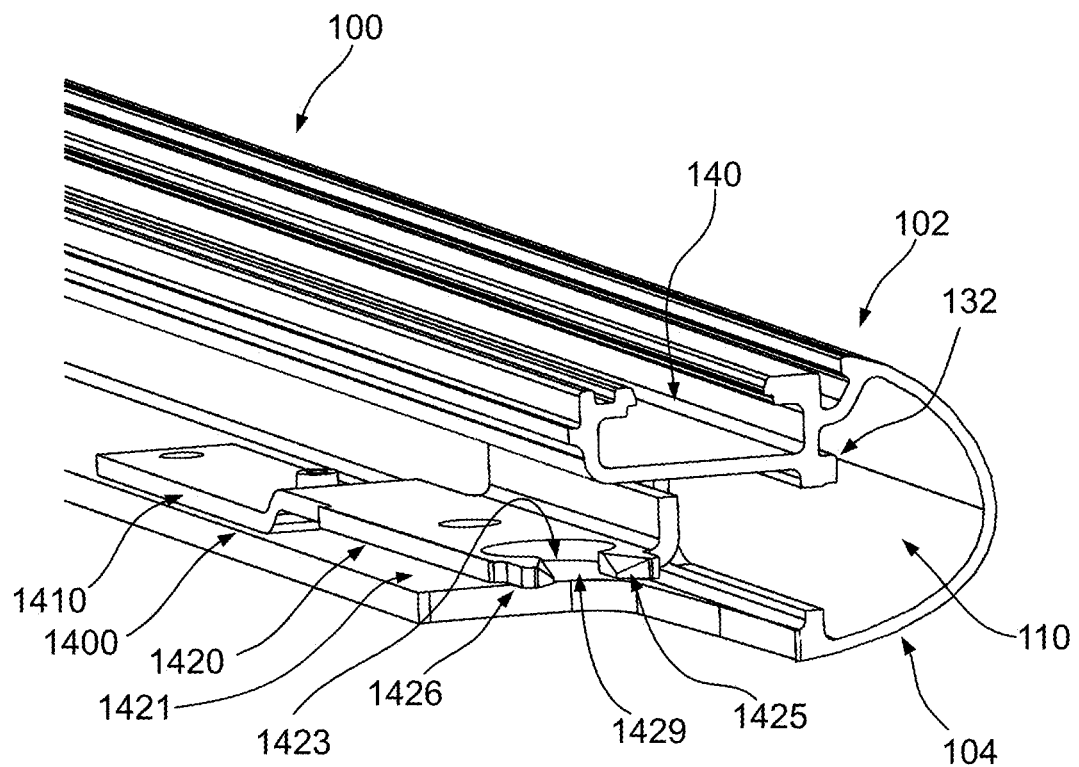
FIG. 24 shows a sectional view of an end portion of a crossbar member according to an embodiment.
Figure 26:
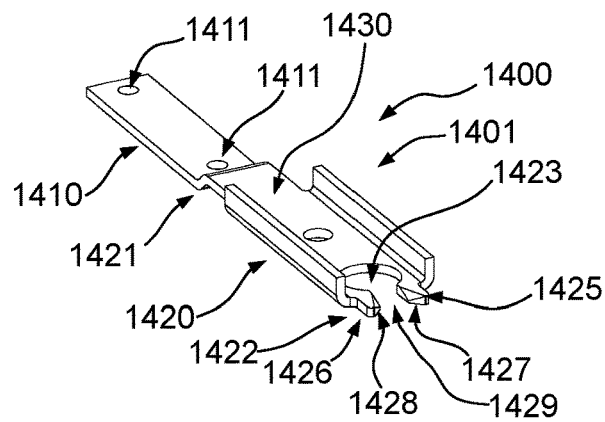
FIG. 26 shows a receiving portion that may be provided in a crossbar member according to an embodiment.

A possible configuration of the receiving portion 1400 will be described with reference to FIG. 26. A first receiving portion 1401 is shown. The receiving portion 1401 comprises a fixation portion 1410 and an engagement portion 1420. In the embodiment, the receiving portion 1401 is integrally formed from cutting and bending a sheet metal 1430. The fixation portion 1410 is configured as a substantially flat portion with fixation openings 1411. The fixation portion 1410 is configured to get in contact with an interior surface portion of the crossbar member 100. The fixation portion 1410 can be fixed to the crossbar member 100 by means of the fixation openings 1411. The engagement portion 1420 continues from the fixation portion 1410 in longitudinal direction of the receiving portion 1401. The engagement portion 1420 is coupled to the fixation portion 1410 at a first end portion 1421 with a step so that the engagement portion 1420 is offset with respect to the fixation portion 1410. Accordingly, if the fixation portion 1410 is fixedly coupled to a crossbar member the engagement portion 1420 is held or extends at a distance from a wall portion of the crossbar member 100 to which the fixation portion 1410 is coupled. In this way, a receiving space 1421 may be provided between the engagement portion 1420 and a wall portion of the crossbar member 100. FIG. 24 shows an arrangement in which the receiving portion 1401 is fixedly mounted on a lower wall portion of a crossbar member 100, more precisely in a portion below the fixation profile 140. At a second end portion 1422, the receiving opening 1423 is provided. The second end portion 1422 may also be referred to as forward end portion. The receiving opening 1423 comprises a substantially circular main portion which is arranged at a distance from the forward end of the engagement portion 1420. Furthermore, an opening 1429 connects the main portion of the receiving opening 1423 with the forward end of the engagement portion 1420. The opening 1429 is configured to allow an insertion of a force transfer member 1330 into the receiving opening 1423 such that the actuating portion 1310 to which the force transfer member 1330 is coupled, may be positioned above the receiving opening 1423, more precisely above the main portion of the receiving opening 1423. The opening 1429 comprises a width which is smaller than the diameter of the receiving opening 1423. The opening 1429 is limited by a first leg portion 1425 and a second leg portion 1426. Each of the first leg portion 1425 and the second leg portion 1426 may comprise a tapering portion 1427, 1428, respectively, each tapered towards the forward end of the engagement portion 1420 such that a thickness of the engagement portion 1420, for example of the first leg portion 1425 and the second leg portion 1426, is at least partially reduced towards its forward end, in particular in a portion limiting the opening 1429. In this way, a guide-in chamfer may be provided. In this way, it is possible to provide a self-locking configuration in which the actuating portion 1310 may be moved in disengaging direction upon inserting a crossbar member 100 comprising the receiving portion 1401 on the coupling member 200. More precisely, in such a configuration, the forward end of the engagement portion 1420 is configured as a wedge which is inserted under the actuating portion 1310 thereby forcing the actuating portion 1310 to move corresponding to a shape of the contact surface of the wedge upon inserting the crossbar member 100. In this way, it is possible that the actuating portion 1310 is raised against an urging force of the spring mechanism 1340 upon inserting the crossbar member 100 and snaps into the receiving opening 1423 as soon as the receiving opening 1423 is aligned with the actuating portion 1310, for example with the conical engaging portion 1313.

Figure 27:
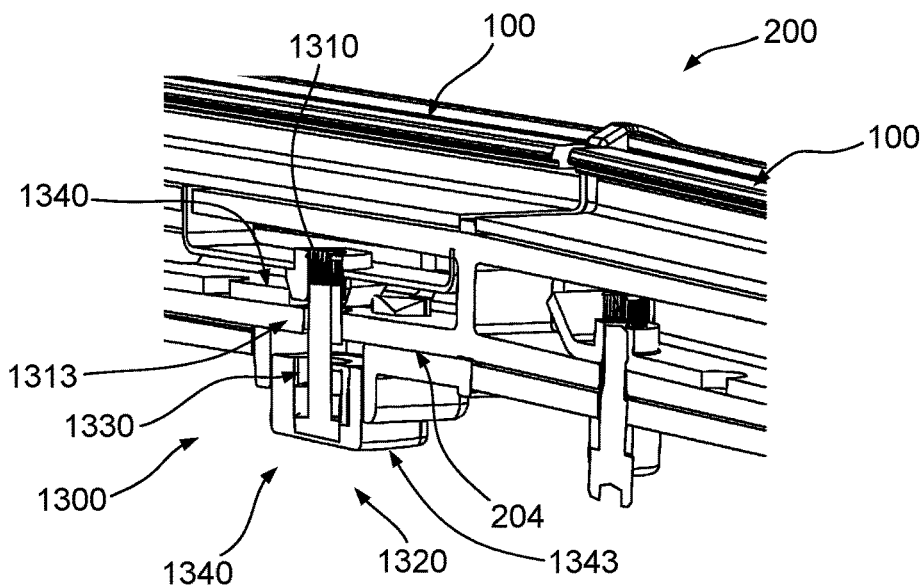
FIG. 27 shows an exemplary configuration of a locking mechanism of a coupling member according to an embodiment.

FIG. 27 shows a configuration in which a crossbar member 100 is inserted on the coupling member 200 comprising a locking mechanism 1300. The locking mechanism 1300 comprises the actuating portion 1310 as shown in FIG. 25 which in the state as shown in FIG. 27 is engaged with the receiving portion 1400 as shown in FIG. 26. In order to disengage the actuating portion 1310 from the receiving portion 1400, an operating portion 1320 comprising a push arrangement 1340 is operatively coupled to the actuating portion 1310 by means of a force transfer portion 1330. The push arrangement 1340 comprises a push button 1343 which upon operation of the same moves the actuating portion 1310 in disengaging direction. Accordingly, as soon as the user has pushed the push button 1343, the actuating portion 1310 is disengaged from the receiving portion 1400 and the crossbar member 100 may be separated from the coupling member 200.

Figure 28:
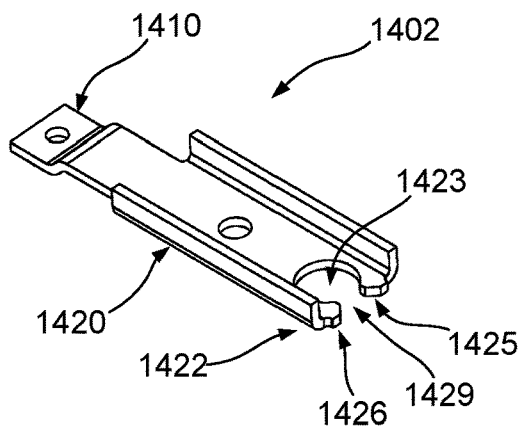
FIG. 28 shows a further receiving portion that may be provided in a crossbar member according to an embodiment.

While the configuration as described with respect to FIGS. 24 to 27 comprises the above-mentioned self-locking function, it is also possible to provide an arrangement in which the actuating portion 1310 is manually moved in the engaging direction by an operation of the user which may be effected by a suitable operating portion 1320. It is noted that configurations in which the actuating portion 1310 is manually moved in the engaging direction do not need the above-described wedge like configuration of the receiving portion 1400. Accordingly, the tapering portions 1427 and 1428 may be omitted. A second receiving portion 1402 which does not comprise such tapering portions 1427, 1428 is shown in FIG. 28. Other features of the second receiving portion 1402 are similar or identical to the features as described above with respect to the first receiving portion 1401.

Figure 29:
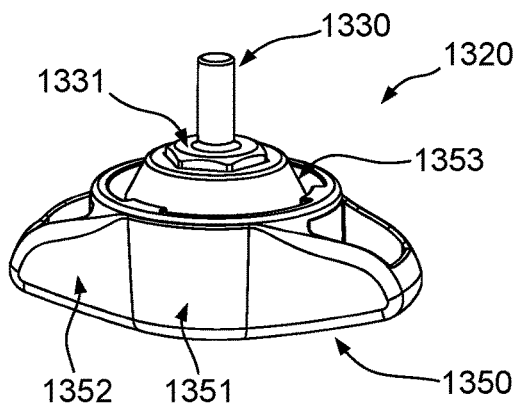
FIG. 29 shows an exemplary operating portion according to an embodiment.

FIG. 29 shows an exemplary operating portion 1320 according to an embodiment. The operating portion is configured as a rotation arrangement 1350 operatively coupled to the force transfer portion 1330 for rotating the same. The force transfer portion 1330 may be coupled to the actuating portion 1310 such that a rotation of the force transfer portion 1330 is transferred into a translational movement of the actuating portion 1310. In particular, the force transfer portion 1330 may be threadedly engaged with the actuating portion 1310. The rotation arrangement 1350 according to the embodiment comprises a knob 1351 having wings 1352 for grasping the same. The knob 1351 is coupled to the force transfer portion 1330 so as to be integrally rotatable with the force transfer portion 1330. Optionally, the rotation arrangement 1350 may comprise a torque limiting mechanism 1353 which limits a torque that is applicable on the force transfer portion 1330 by a user. In this way, damage resulting from excessive tightening may be prevented. As is also shown in FIG. 29 the force transfer member 1330 may comprise a contact section 1331 which is configured to get in contact with an outer surface of a crossbar member 100.

Figure 30:
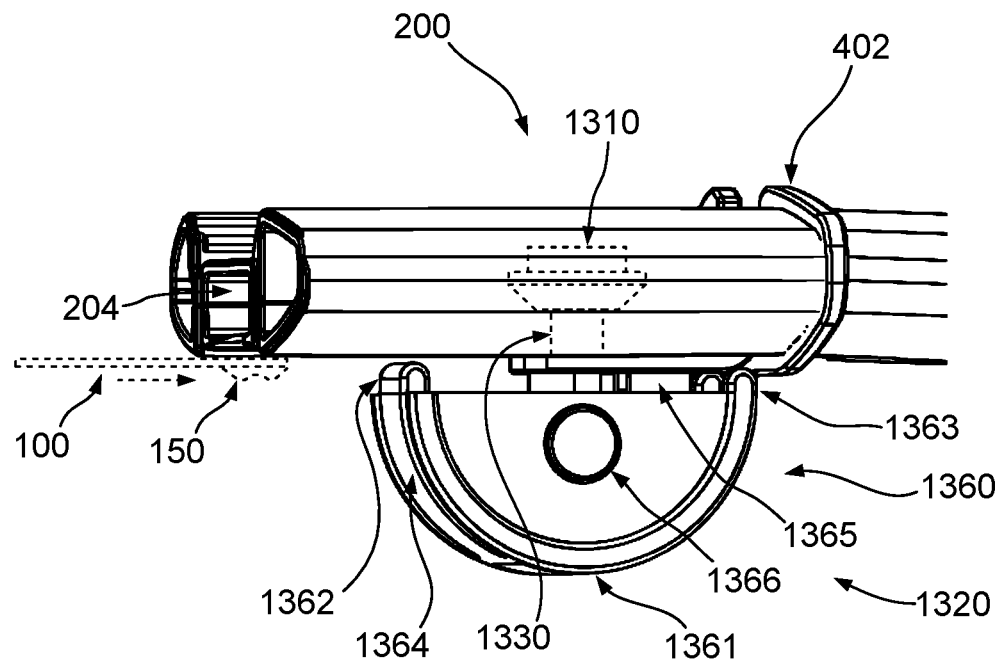
FIG. 30 shows an alternative configuration of a locking mechanism of a coupling member according to an embodiment.
Figure 31:
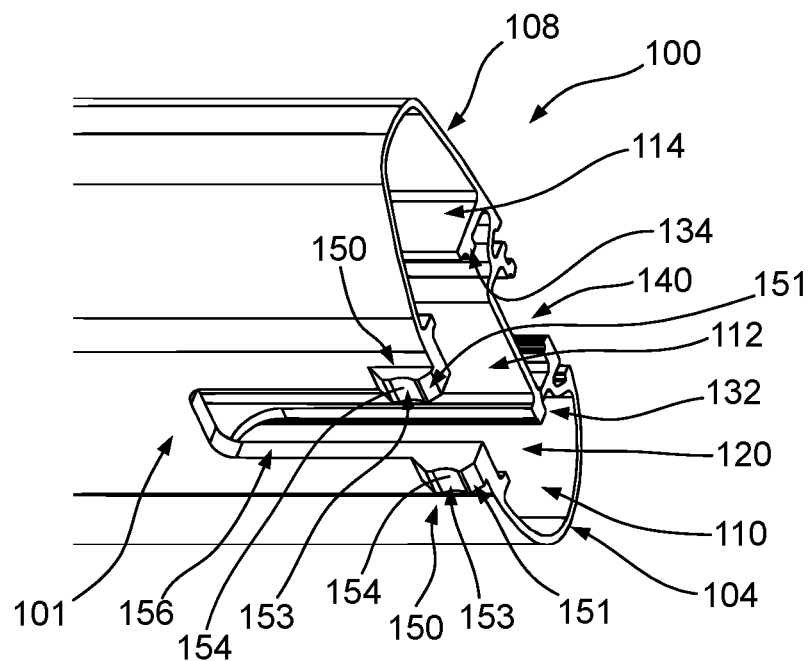
FIG. 31 shows a perspective view from below of an end portion of a crossbar member according to an embodiment, wherein the crossbar member is able to cooperate with the locking mechanism shown in FIG. 30.

FIG. 30 shows an alternative configuration of a locking mechanism of a coupling member according to an embodiment. FIG. 31 shows a perspective view from below of an end portion of a crossbar member according to an embodiment, wherein the crossbar member is able to cooperate with the locking mechanism shown in FIG. 30. In this configuration, the operating portion 1320 is configured as a pull arrangement 1360. The pull arrangement 1360 is operatively coupled to the force transfer portion 1330 and configured to apply a pulling force on the force transfer member 1330 for moving the same and an actuating portion 1310 coupled thereto.

The pull arrangement 1360 preferably comprises a lever arrangement operatively coupled to the force transfer portion 1330 by means of a pivot 1366, for translatory moving the same. The pull arrangement 1360 may comprise a lever 1361 with a rear supporting portion 1362 for supporting the same on an outer surface of a crossbar member 100 and a forward supporting portion 1363 for supporting the same on an outer surface of a crossbar member 100. The rear supporting portion 1362 and the forward supporting portion 1363 are provided on opposite sides of the pivot 1366. The rear supporting portion 1362 may be coupled to the lever 1361 via an elastic portion 1364 and may be configured to contact an outer surface portion of a crossbar member. The forward receiving portion may be configured to get in contact with at least one actuating protrusion 150 provided on said crossbar member 100 as shown in FIG. 31. The actuating protrusion 150 may be provided on an end portion of the crossbar member 100 and may be configured to urge the forward supporting portion 1363 in a direction facing away from said coupling member 200 upon inserting the crossbar member 100 on the coupling member 200 thereby displacing the pivot 1366 and applying a pulling force on the force transfer portion 1330.

The actuating protrusion 150 may comprise a lifting portion 151. The lifting portion 151 may comprise a wedge like portion comprising an inclined surface which extends from the outer surface of said crossbar member and is configured to move the forward supporting portion 1363 in a direction away from said elongate coupling segment. The actuating protrusion may further comprise an arresting portion 153 continuing from the lifting portion 151. The arresting portion 153 may comprise a recess 154 in which the forward supporting portion 1363 may rest in a state in which said crossbar member 100 is correctly inserted on the coupling member 200. Alternatively, the arresting portion 153 may comprise a surface which is inclined or curved in opposite direction with respect to the surface of the lifting portion 151. In other words, the surface of the lifting portion 151 and the surface of the arresting portion 153 may meet at an apex portion. This apex portion is passed by the forward supporting portion 1363 against an urging force applied on the lever 1361 by the spring mechanism and/or a receiving portion 1400 displacing the actuating portion 1310, so that the forward end portion 1363 is securely arrested as soon as the forward supporting portion has slidingly passed the apex portion.

In an embodiment, the crossbar member 100 may be inserted on the coupling member 200 such that its wall comprising the actuating protrusion 150 is moved along the elongate coupling segments towards the forward supporting portion 1363 as is indicated in FIG. 30. It is noted that each actuating protrusion, two are provided according to an embodiment, are laterally offset such that they do not contact rear supporting portion 1362 and may pass the same. It follows that the rear supporting portion 1362 is positioned laterally offset with respect to any actuating protrusion 150. In order to allow the actuating protrusions 150 to be positioned at the forward supporting portion 1363, the crossbar member 100 may comprise a slot 156 in its lower wall configured to receive said a portion of the force transfer member 1330 so that lateral side portions of the lower wall carrying the actuating protrusion may laterally pass the force transfer member 1330 when sliding the crossbar member 100 towards a middle portion 402 of the coupling member 200 as shown in FIG. 30. In order to hold the lever 1361 in an initial position allowing an insertion of a portion of the crossbar member between lever 1361 and elongate coupling segment 204, the lever may comprise an abutment portion 1365 which may serve as a stop for holding the forward supporting portion 1363 at a predetermined distance from an outer surface of elongate coupling segment 204 when the pivot is pulled upwards by a restoring force of the spring mechanism 1340. In addition or alternatively, an urging member urging the lever 1361 away from the coupling member may be provided.

When the crossbar member 100 is fully inserted on the coupling member, the rear supporting portion 1362 is in contact with a surface portion 101 behind slot 156 and the forward supporting portions 1363 are positioned in the recesses 154. Accordingly, a lever force is generated on the pivot 1366 exerting a pulling force on the force transfer member 1330 with the rear supporting portion 1362 acting as fulcrum. In this way, the actuating portion 1310 may be fixedly held in engagement with the receiving portion 1400 so that the crossbar member 100 is securely locked to the coupling member.

In an embodiment, the forward supporting portion 1363 may be disengaged from the recess 154 by moving the forward supporting portion 1363 in a direction cross to the longitudinal direction of the crossbar member 100 along the outer surface on which the actuating protrusion 150 is provided. This may be done by a user through pushing the forward lever portion with the thumb, for instance. In an embodiment, the forward supporting portion 1363 may be pivoted about a force transfer portion 1330, for example in a plane extending perpendicular to the force transfer portion 1330 and/or parallel to elongate coupling segment 204 and an inserted crossbar member 100. In this way, the forward supporting portion 1363 may come off of the recess 154 by a movement in lateral direction. The abutment portion 1365 may in addition or alternatively to the above mentioned function serve as a return member for returning the lever 1361 to an engaging position in which the forward supporting portion 1363 is correctly positioned for an engagement with the actuating protrusion. For example, the abutment portion may comprise an urging member, for example a spring which is deformed upon moving the forward supporting portion 1363 in cross direction for disengaging the same from the actuating protrusion 150. In other words, disengagement takes place against a return spring force which, after disengagement of the crossbar member 100 from the coupling member, will return the lever 1361 to the engaging position, for example a position in which the lever extends in parallel to the longitudinal extension direction of an elongate coupling segment to which it is mounted.

Figure 32:
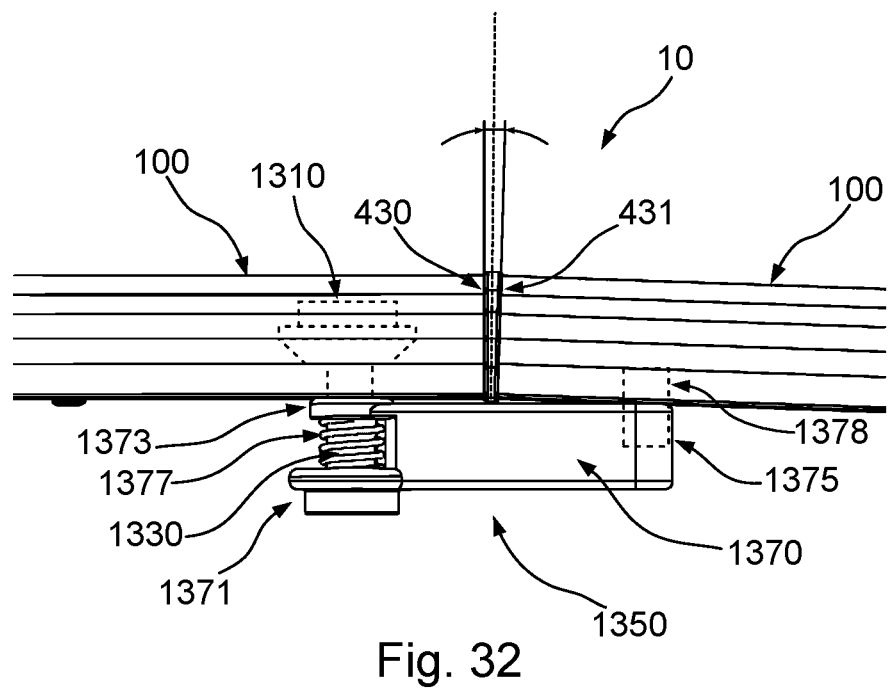
FIG. 32 shows a further configuration of a locking mechanism and details of a possible angled configuration of the crossbar members.
Figure 33:
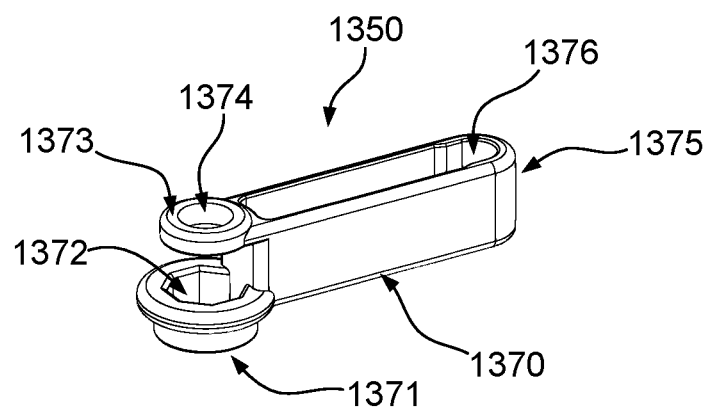
FIG. 33 shows a further operating portion usable in connection with a locking mechanism according to an embodiment, in particular in connection with a configuration as shown in FIG. 23.

FIGS. 32 and 33 show details of a further configuration of a locking mechanism and details of a possible angled configuration of the crossbar members. In this embodiment, the rotation arrangement 1350 comprises a lever 1370 with a coupling portion 1371 at a first end portion thereof and an engaging portion 1375 at a second end thereof. The coupling portion 1371 may comprise an accommodating recess 1372 being non-circularly formed according to the shape of a counter portion, for example a bolt head, on the force transfer portion. The shape may be hexagonal, octagonal or other polygonal shape but may include curved shapes that are non-round. The supporting portion 1373 may comprise a through opening 1374 for slidably receiving a portion of the force transfer portion 1330 and may be arranged at a distance from said accommodating recess 1372 in an extension direction of an inserted force transfer portion 1330. An urging member 1377, for example a coil spring, may be provided in a space between the supporting portion 1373 and the coupling portion 1371, in particular such that the urging member 1377 contacts the supporting portion 1373 and a portion on the force transfer member 1330, for example a bolt head, so that the lever 1370 may be moved along the force transfer member 1330 against an urging force of the urging member 1377. The supporting portion 1373 may be configured to contact an inserted crossbar member 100 on a side facing away from the coupling portion 1371, and to support the urging member 1377 on a side facing towards the coupling portion 1371. The configuration as shown in FIG. 32 comprises an internal rotation stop. The engaging portion 1375 may comprise a recess 1376 for accommodating a protrusion, for example a portion of a fixation member 1378 for coupling a further crossbar member 100 to the coupling member 200 on an opposite side. Such a configuration may be referred to as internal rotation stop as an internal engagement leads to a blocking of a rotational movement of the lever. The lever 1370 forms an operating portion usable in connection with a configuration as shown in FIG. 23. The concept is based on an arm 1370 on a tightening screw 1330. The arm can be pulled down for disengagement and is spring loaded for automatically returning upwards. In the upward position, the arm is rotationally locked with the force transfer portion 1330. The arm has a rotation blocked parking position and can be pulled down and turned to be released from the parking position. For tightening or untightening, the arm is turned when positioned in the upward position. The arm position may be changed relative to the force transfer member 1330 by pulling the same down and turning the same to a new position at which the arm can be reengaged with the force transfer member so as to be rotationally fixed therewith. At quick assembly, the male half (coupling member) is inserted into female half (crossbar member) until the conical nut (actuating portion 1310) clicks into the opening 1423. After that the arm is tightened and brought into its parking position as shown in FIG. 32.

The configuration can be angled with respect to a coupling portion 402. The coupling portion 402 may comprise wall like portion. The wall like portion may comprises a wedge shape as shown in FIG. 32. The wall like portion may comprise abutment surfaces 430, 431 extending at an angle with respect to each other. The abutment surfaces 430, 431 are respectively formed in a plane and are configured for contacting longitudinal end portions of crossbar members 100. An angle between the abutment surfaces 430, 431 may be smaller than 5 degrees or may be 2 degrees. In addition or alternatively, an angle of each abutment surface with respect to a middle plane may be 2 degrees or smaller and may be 1 degree. With such a coupling member, a configuration may be achieved in which crossbar members extend or meet at an angle equal to or greater than 175 degrees and smaller than 180 degrees, for example at an angle of 178 degrees or greater.

Figure 34:
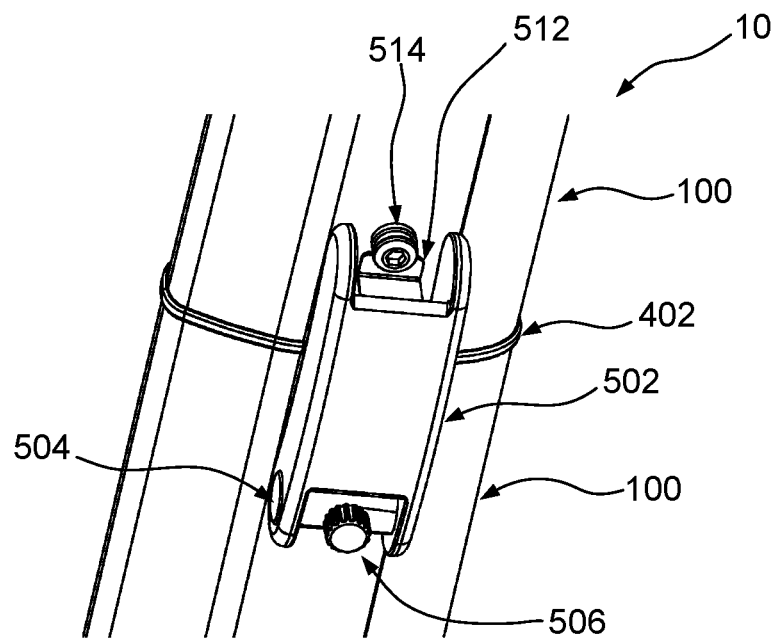
FIG. 34 and FIG. 35 show an alternative operating portion usable in connection with a locking mechanism according to an embodiment, in particular in connection with a configuration as shown in FIG. 23.
Figure 35:
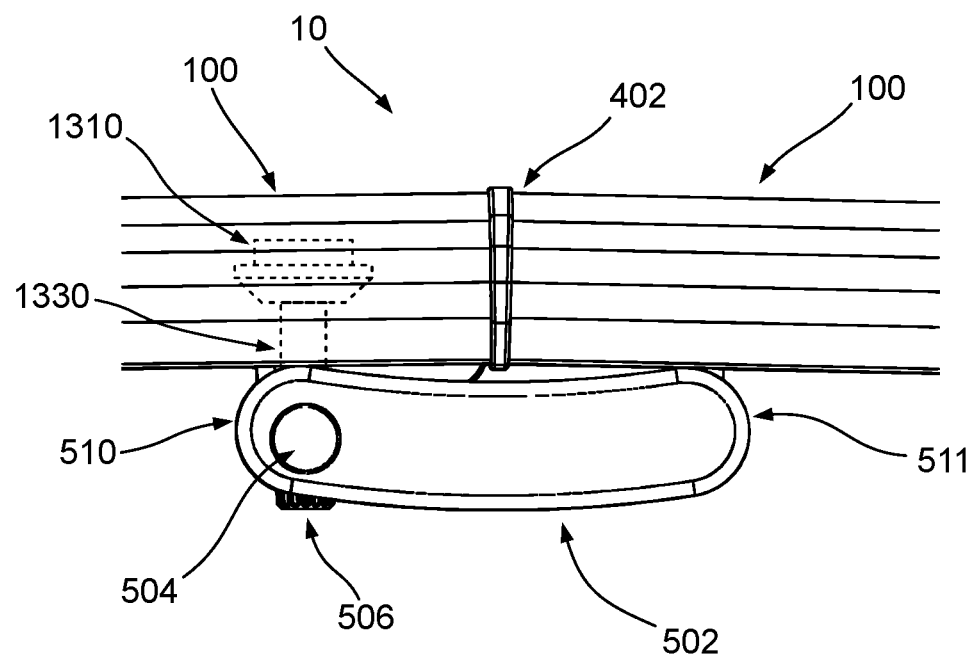

FIG. 34 and FIG. 35 show an alternative operating portion usable in connection with a locking mechanism according to an embodiment, in particular in connection with a configuration as shown in FIG. 23. The embodiment as shown in FIGS. 34 and 35 have a similar tightening function as the tightening mechanism shown in FIG. 13. Similar portions are marked with identical reference signs and it is referred to the explanation as already given herein. Besides the different shape of the tightening lever 502, the embodiment according to FIGS. 34 and 35 comprises a locking mechanism 512 provided in a rear portion 511 of the tightening lever 502. The locking mechanism 512 comprises an engaging member engageable with a receiving member to thereby lock the tightening lever 502 in a locking position. Accordingly, the tightening lever 502 may be brought into and held in a secure position and may only be brought into an unlocking position if a user actively unlocks the locking mechanism 512 first. The locking mechanism may comprise an engaging member, for example a hook-like engaging member, which automatically engages with a protrusion when said tightening lever 502 is in a locked state. The protrusion may be a head of a fixation bolt 514 arranged on a crossbar member that is not clamped by the tightening configuration 500 as is shown in FIG. 34. In this embodiment, the tightening member 506 corresponds to a force transfer member 1330 in other embodiments. The tightening member 506 may be part of a locking mechanism 1300 and may cooperate with the actuating portion 1310, for example for pulling the latter actuating portion 1310 towards a lower wall of the elongate coupling segment in which it is provided. The tightening member 506 may be threadedly engaged with the threaded opening 1314 provided in said actuating portion 1310.

FIG. 36 shows a further exemplary embodiment of a coupling member in longitudinal sectional view, in particular relating to the use of a different kind of actuating portion. The actuating portion 1310 is integrated in a lower wall portion of an elongate coupling segment 204, in particular such that it is not rotatable and fixedly held. The actuating portion 1310 according to this embodiment may be engaged with a force transfer portion 1330. With this configuration, the coupling member 200 may be clamped to crossbar member 100 by pulling the actuating portion 1310 and, thus, the lower wall of elongate coupling segment towards an inner wall of the crossbar member 100. In this way, a secure fixation may be achieved.

Figure 37:
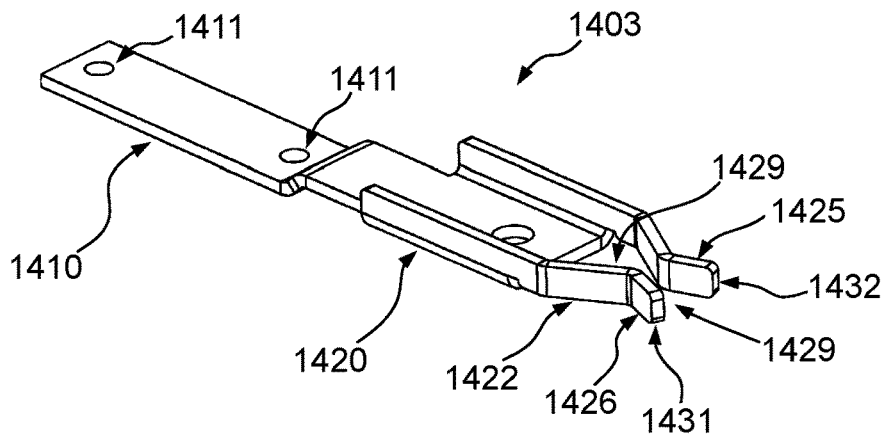
FIG. 37 shows a further receiving portion that may be provided in a crossbar member usable with the coupling member according to FIG. 36.

FIG. 37 shows a further receiving portion 1403 that may be provided in a crossbar member 100 usable with the coupling member 1310 according to FIG. 36.

The receiving portion 1403 is, to a certain extent, configured similar to the above receiving portions 1401 and 1402. Similar parts are marked with the same reference signs. The receiving portion 1403 differs from the receiving portions 1401 and 1402 in that it comprises a different forward end portion 1422, in particular a different opening 1429. The opening 1429 is configured to receive the actuating portion 1310 by radially engaging the actuating portion 1310 and is configured with a dimension which is greater than the dimension of the actuating portion 1310. In other words, the receiving portion 1403 is only used to create a click-in function with actuating portion 1310 fixedly provided in the lower wall of the elongate coupling segment in upon inserting the crossbar member 100 and the coupling member 200, more precisely in insertion direction of the crossbar member 100. Tightening the actuating portion 1310 will in this configuration not apply a force on the engagement portion 1420. For that, the first leg portion 1425 and the second leg portion 1426 are formed to create a funnel like insertion area between tip end portions 1431, 1432 of said leg portions 1425, 1426 in a manner that the actuating portion 1310 has to urge the leg portions away from each other upon insertion. In other words, the leg portions act as spring members withstanding a predetermined force that needs to be overcome to pass the actuating portion 1310 between the leg portions and into the opening 1429.

Figure 38:
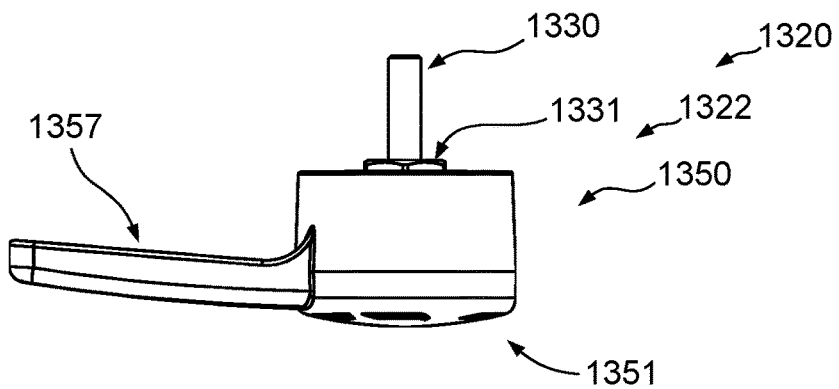
FIG. 38 shows a further operating portion usable in connection with a locking mechanism according to an embodiment, in particular in connection with a configuration as shown in FIG. 36.

FIG. 38 shows a further operating portion 1322 usable in connection with a locking mechanism comprising receiving portion 1403, in particular in connection with a configuration as shown in FIG. 36. Again, the operating portion 1322 is a rotation arrangement 1350 having a knob 1351. A lever 1357 is coupled to the knob 1351 and extends from the same in radial direction of the knob. The knob 1351 may be held on the force transfer portion 1330 in a manner shiftable along the longitudinal direction of the force transfer portion 1330 but rotationally fixed therewith so as to be always able to transfer a rotational force to the force transfer portion 1330. A torque limiting mechanism may be provided in the knob 1351. The force transfer member again comprises a contact section 1331 as described before in connection with the embodiment of FIG. 29.

Figure 39:
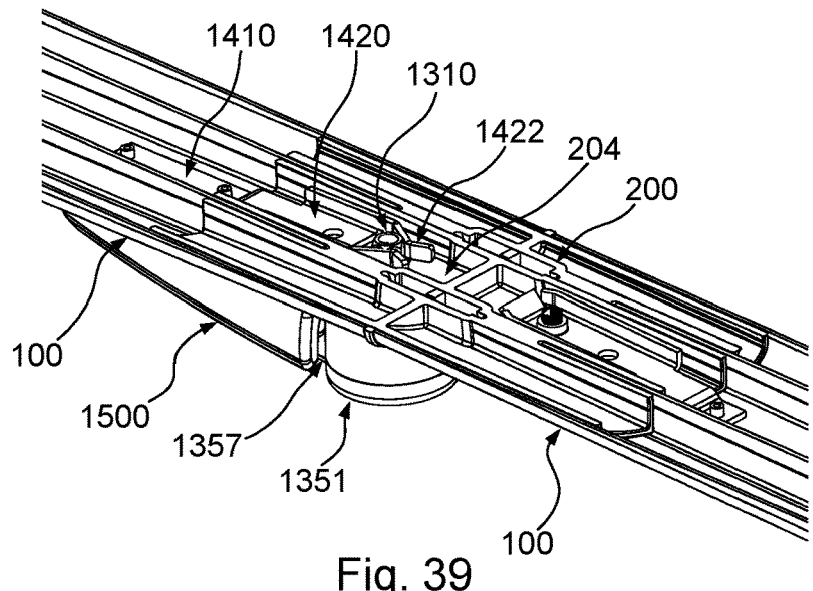
FIGS. 39 and 40 show perspective views of an assembled crossbar comprising two crossbar members and a coupling member as shown in FIG. 36.
Figure 40:
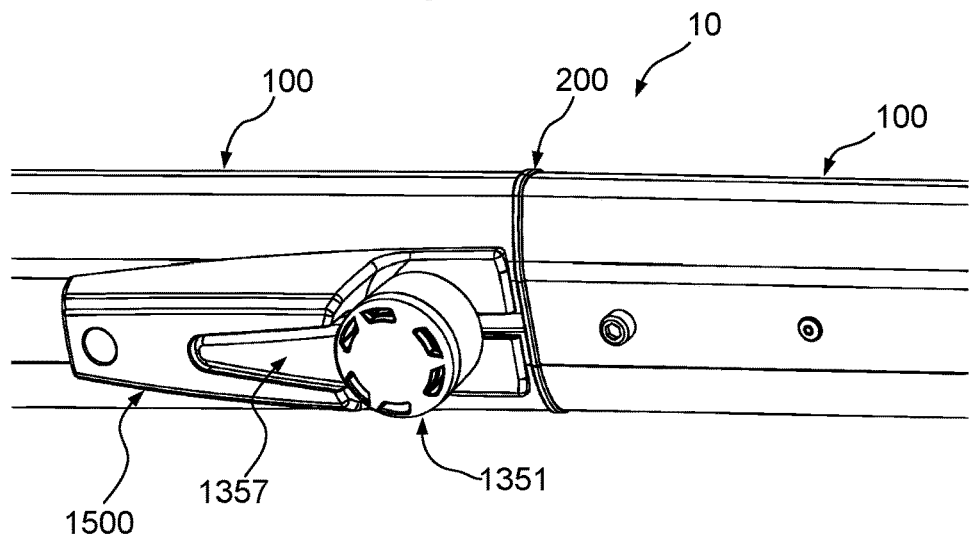

FIGS. 39 and 40 show perspective views of an assembled crossbar comprising two crossbar members and a coupling member as shown in FIG. 36 and an operating portion as shown in FIG. 38. In addition to the features already described before in connection with the respective elements, the coupling member may comprise an accommodating portion 1500 configured to at least partially receive the rotation arrangement 1350, in particular lever 1357. The accommodating portion 1500 may be configured to conceal a portion of said rotation arrangement and/or may be configured to serve as an abutment portion or rotation stop for the rotation arrangement 1322. Since the accommodating portion 1500 receives a portion of the lever for blocking rotation, such a configuration may be referred to as external rotation stop. The accommodating portion 1500 may be movably, slidably and/or pivotably arranged on the crossbar member 100 so as to transfer said accommodating portion 1500 between a position in which said rotation arrangement 1350 is partially received therein and a position in which said rotation arrangement 1350 is not received therein and allowed to rotate. Alternative, the accommodating portion may be fixed and the lever 1357 may be inserted into the recess of the accommodating portion 1500 by lifting the knob 1351 to a position in which the lever 1357 may pass the accommodating portion 1500. In this way, the lever may be aligned with the recess and inserted therein. The knob may be prebiased so as to automatically return to a retracted position.

Figure 41:
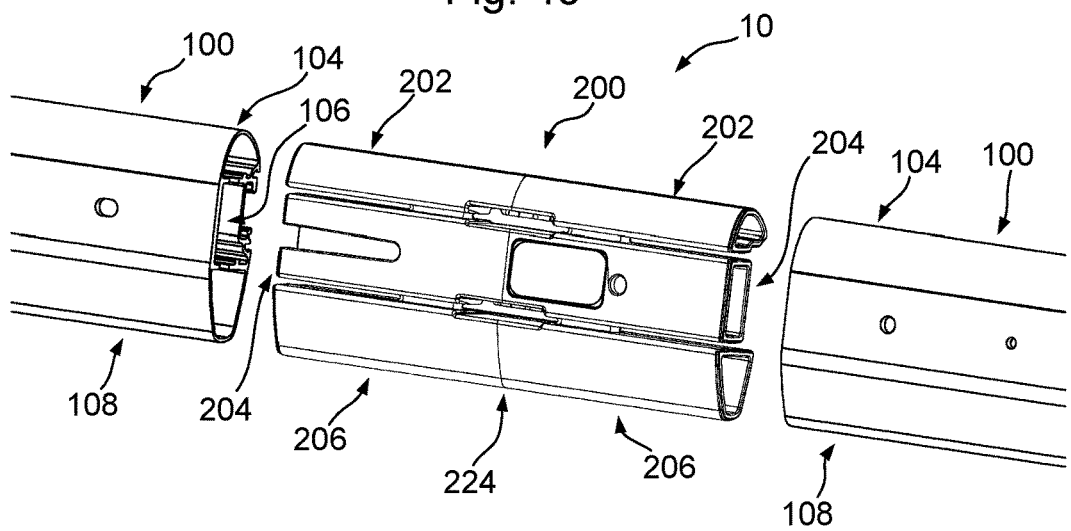
FIG. 41 shows an exploded view of a collapsible crossbar.

FIG. 41 shows an exploded view of a collapsible crossbar 10 showing main components of the collapsible crossbar 10 in a longitudinally offset manner. More precisely, two crossbar members 100 and a coupling member 200 for coupling the crossbar members 100 to each other. The reference signs are only exemplary, and it is noted that other crossbar members as described before and coupling members may be suitably combined to form a collapsible crossbar.

Possible configurations will be described below in itemized structure. It is noted that the configuration of coupling members and crossbar members may be suitable for any collapsible roof rack, particularly divisible/split type for example according to the embodiments and configurations as described before. The features as described in the different configurations may be combined with features as described before. Furthermore, the features of the below configurations may be suitably combined.

First Configuration

1. Coupling member (200; 600; 800) fixable to an end portion (102) of a crossbar member (100; 700), said coupling member (200) being configured for coupling two crossbar members (100) to each other or for coupling a crossbar member (100) to a load carrier foot (20), wherein said coupling member can be a part, preferably an integral part, of said load carrier foot (20), said coupling member (200; 600; 800) comprising one or more elongate coupling segments (202, 204, 206; 802) configured to be at least partially inserted in a longitudinally extending interior space (110, 112, 114; 702) of said crossbar member (100), wherein said one or more elongate coupling segments (202, 204, 206; 802) comprise an engagement portion (216, 218; 602, 604) non-movably provided thereon and configured to engage behind an interior engaging portion (132, 134) of said crossbar member (100; 700).

2. Coupling member (200; 600; 800) fixable to an end portion (102) of a crossbar member (100; 700), said coupling member (200) being configured for coupling two crossbar members (100) to each other or for coupling a crossbar member (100) to a load carrier foot (20), wherein said coupling member can be a part, preferably an integral part, of said load carrier foot (20), said coupling member (200; 600; 800) comprising one or more elongate coupling segments (202, 204, 206; 802) configured to be at least partially inserted in a longitudinally extending interior space (110, 112, 114; 702) of said crossbar member (100), wherein said one or more elongate coupling segments (202, 204, 206; 802) comprise an engagement portion (216, 218; 602, 604) integrally formed therewith and configured to reach behind an interior engaging portion (132, 134) of said crossbar member (100; 700) for an engagement with said crossbar member (100; 700).

3. Coupling member according to clause 1 or clause 2, wherein said engagement portion (216, 218; 602, 604) is configured to engage behind or reach behind said interior engaging portion (132, 134) of said crossbar member (100; 700) upon inserting said elongate coupling segment (202, 204, 206; 802) in said crossbar member (700).

4. Coupling member according to one of the preceding clauses, wherein said engagement portion (216, 218; 602, 604) is configured to engage behind or reach behind said interior engaging portion (132, 134) of said crossbar member (100; 700) in a direction cross to an insertion direction of said coupling member (200; 600; 800), to establish a lateral positive locking connection between coupling member and crossbar member and/or to establish a positive locking with said interior engaging portion (132, 134) at least in a direction cross to an insertion direction of said coupling member (200; 600; 800), and/or to establish a positive locking with said crossbar member cross to an insertion direction of said coupling member.

5. Coupling member (200) according to one of clauses 1 to 4, further comprising at least one engagement portion (216, 218), preferably a hook-like protrusion, configured for an engagement with an interior portion of said crossbar member (100), preferably for an engagement with or behind a protrusion or engaging portion (132, 134) formed inside said crossbar member (100), preferably a protrusion operatively coupled to an upper portion (124) of said crossbar segment (100) and providing a supporting surface (136, 138) configured for an application of a clamping force, preferably for an application of a clamping force in a direction inwards into said crossbar member (100), preferably towards a lower portion (126) of said crossbar member (100).

6. Coupling member (200) according to clause 5, wherein said engagement portion (216, 218) is provided on said coupling member (200) at a longitudinal position adjacent to or partially overlapping with the coupling portion (208, 210) and/or wherein preferably said engagement portion (216, 218) is provided on a side of said coupling portion (208, 210) opposite to the side where said receiving space (212, 214) is formed such that said receiving space (212, 214), said coupling portion (208, 210) and said engagement portion (216, 218) are arranged in this order one after another in longitudinal direction of said coupling member (200) and/or wherein preferably engagement portions (216, 218) are provided on both sides of said coupling portion (208, 210) wherein preferably one engagement portion is provided at a free end of said coupling segments at a position where said receiving space (212, 214) is formed.

7. Coupling member (200) according to one of the preceding clauses, wherein said coupling member (200) comprises a fixation portion configured to be coupled to a load carrier foot (20) or is integrally formed with said load carrier foot (20), or wherein said coupling member (200) is configured to be coupled to a crossbar segment (200) on each longitudinal end thereof and/or wherein said coupling member (200) is made from plastic or steel.

8. Crossbar member (100; 700) for a crossbar of a vehicle mountable rack, said crossbar member (100; 700) being formed by a closed profile comprising at least one hollow portion (104, 106, 108; 702) extending in longitudinal direction of said crossbar member (100) and comprising an interior space (110, 112, 114; 702) for at least partially receiving a coupling member (200) therein, characterized by at least one interior engaging portion (132, 134) configured to be engaged from behind or be reached from behind by an engagement portion (216, 218; 602, 604; 802, 804) of said coupling member (200; 600; 800), preferably upon inserting said elongate coupling segment (202, 204, 206; 802) in said crossbar member (700) and/or preferably in a direction cross to an insertion direction of said coupling member (200; 600; 800).

9. Crossbar member (100) according to clause 8, further comprising an engaging portion (132, 134) operatively coupled to said upper portion (124) and configured for being pulled or urged towards said lower portion (126), wherein said engaging portion (132, 134) is configured to provide a force receiving surface (136, 138) oriented towards said upper portion (124), wherein preferably said force receiving surface (136, 138) is provided on a protrusion protruding from said upper portion (124), wherein said protrusion is preferably formed on said upper portion (124) and extends along the longitudinal direction, preferably over the entire length of said crossbar member (100).

10. Crossbar member (100) according to one of clauses 8 and 9, wherein the profile of said crossbar member (100) is wing, square, circular or oval shaped and is preferably made by extruding aluminum, wherein preferably a fixation profile such as a T-track (140) is provided in said upper portion (124) for coupling accessories, for example a bike carrier, to said crossbar member (100), and/or wherein preferably said crossbar member (100) is a full-length crossbar couplable to load carrier feet at opposite ends thereof or is a crossbar segment of a divisible crossbar.

11. Rack system (1) comprising a coupling member according to one of clauses 1 to 7 and a crossbar member according to one of clauses 8 to 10.

Second Configuration:

1. Coupling member (400) fixable to an end portion (102) of a crossbar member (100; 700), said coupling member (400) being configured for coupling two crossbar members (100) to each other,
   said coupling member (200; 600; 800) comprising two or more elongate coupling segments (202, 204, 206; 802) configured to be at least partially inserted in a longitudinally extending interior space (110, 112, 114; 702) of said crossbar member (100),
   said coupling member (400) comprising a coupling portion (402) for coupling longitudinal end portions of said elongate coupling segments (202, 204, 206; 802) to each other with at least two of said elongate coupling segments (202, 204, 206; 802) extending from opposite sides of said coupling portion (402).

2. Coupling member (400) according to clause 1, wherein said coupling portion comprises a wall like portion.

3. Coupling member (400) according to clause 1 or clause 2, wherein said coupling member (400) is configured non-symmetrically with respect to said coupling portion (402) and/or wherein at least two elongate coupling segments (202, 204) extending from opposite sides of said coupling portion have a differing dimension and/or configuration, in particular a different length.

4. Coupling member (400) according to clause 1 or clause 2, wherein said coupling member (400) is configured symmetrically with respect to said coupling portion (402), for example in that at least two of said elongate coupling segments (202, 204) have an identical length or extend from said coupling portion (402) in a mirrored manner, for example at the same angle from said coupling portion (402) and/or with the same extension curvature.

Third Configuration:

1. Rack system (1) comprising a crossbar member (1000) and a coupling member (1100) couplable to said crossbar member (1000), wherein said crossbar member (1000) and said coupling member (1100) are configured such that a fixation member (900) is passable through the crossbar member (1000) and an inserted coupling member (1100) for locking said coupling member (1100) to said crossbar member (1000) by connecting an upper wall portion and a lower wall portion of said crossbar member (1000), so that at least a positive locking between said crossbar member (1000) and said coupling member (1100) is achieved to prevent a relative movement between coupling member (1100) and crossbar member (1000) in longitudinal direction.

2. Rack system (1) according to one of the preceding clauses, wherein said fixation member (900) may be tightened such that said crossbar member (1000) exerts a pressing force on said coupling member (1100) such that both elements are coupled in a press fit manner.

3. Rack system (1) according to one of the preceding clauses, wherein at least one end portion of said fixation member (900) is accommodated within an outer contour of said crossbar member (100), for example in a groove or other open profile used for fixation purposes, for example a T-track, or in an accommodating space formed below said T-track, so as to not interfere with fixation members fixable in the open profile, such as accessory T-bolts.

4. Rack system (1) according to one of the preceding clauses, wherein said fixation member is accommodated and arranged such that at least one of its end portions does not protrude outside of an envelope of said crossbar member (100).

Fourth Configuration:

1. A coupling member (200) configured for coupling two crossbar members (100), wherein the coupling member (200) comprises two elongate coupling segments (202, 204, 206) joined to each other by coupling longitudinal end portions of the elongate coupling segments to each other at a coupling portion (224) of the coupling member (200), wherein the coupling segments are joined to each other such that they extend with respect to each other at an angle or meet each other at an angle.

2. Coupling member (200) according to clause 1, wherein said coupling member is symmetrical with respect to a middle portion (224, 402) or a plane of symmetry of said coupling member at a position where said coupling segments are joined to each other at their longitudinal end portions.

3. Coupling member (200) according to clause 1, wherein said coupling member is non-symmetrical with respect to a middle portion (224, 402) or a plane of symmetry of said coupling member at a position where said coupling segments are joined to each other at their longitudinal end portions.

4. Coupling member (200) according to one of clauses 2 and 3, wherein said middle portion comprises a coupling portion (402) configured as a wall like portion.

5. Coupling member (200) according to clause 4, wherein said wall like portion comprises a wedge shape, in particular with abutment surfaces (430, 431) extending at an angle with respect to each other, said abutment surfaces (430, 431) being respectively formed in a plane and being configured for contacting longitudinal end portions of crossbar members (100).

6. Coupling member (200) according to clause 5, wherein said angle between said abutment surfaces (430, 431) is smaller than 5 degrees or is 2 degrees and/or wherein an angle of each abutment surface with respect to a middle plane is 2 degrees or smaller and may be 1 degree.

7. Rack system comprising a divisible crossbar comprising at least two crossbar members and at least one coupling member, wherein said coupling member and/or said crossbar members are configured such that said crossbar members extend at or meet at an overcompensation angle with respect to each other, said overcompensation angle being predefined for substantially compensating for a bending of said rack system under load.

8. Rack system according to clause 7, wherein said coupling member is a coupling member according to one of the preceding clauses.

9 Rack system according to clause 7 or 8, wherein said crossbar members extend or meet at an angle equal to or greater than 175 degrees and smaller than 180 degrees, preferably at an angle of 178 degrees or greater.

Fifth Configuration:

1. Crossbar member (100) for a crossbar of a vehicle mountable rack, said crossbar member (100) being formed by a closed profile comprising at least one hollow portion (104, 106, 108) extending in longitudinal direction of said crossbar member (100) and comprising an interior space (110, 112, 114) for at least partially receiving a coupling member (200) therein, characterized by
   a safety mechanism (1200) which upon mounting said crossbar member (100) to said coupling member (200) actively forces a user to correctly interlock said coupling member (200) and said crossbar member (100) for properly fixing said crossbar member (100) to said coupling member (200).

2. Crossbar member (100) according to clause 1, wherein said safety mechanism (1200) is configured to actively displace said crossbar member (100) inserted on said coupling member (200) away from a predetermined locking position on said coupling member (200) such that said crossbar member (100) and said coupling member (200) are wrongly positioned with respect to each other, if said crossbar member (100) is not fixed to said coupling member (200) at said predetermined locking position.

3. Crossbar member (100) according to one of clauses 1 and 2, said safety mechanism (1200) comprising an urging portion (1202) for applying a force on said coupling member (200) in a direction urging said coupling member (200) and said crossbar member (100) away from each other, so that correctly positioning said crossbar member (100) on said coupling member (200) has to be carried out against a predetermined urging force.

4. Crossbar member (100) according to clause 3, wherein said urging portion (1202) comprises an urging member (1204) which is configured to provide a predetermined urging force on said coupling member (200) when said crossbar member (100) is correctly positioned on said coupling member (200).

5. Crossbar member (100) according to clause 4, wherein said urging member (1204) comprises an elastic member (1206), for example a spring, in particular a coil spring.

6. Crossbar member (200) according to clause 5, wherein said elastic member (1206) is configured to apply a force in longitudinal direction of said crossbar member (200).

7. Coupling member (200; 600; 800) fixable to an end portion (102) of a crossbar member (100; 700), said coupling member (200) being configured for coupling two crossbar members (100) to each other or for coupling a crossbar member (100) to a load carrier foot (20), wherein said coupling member can be a part, preferably an integral part, of said load carrier foot (20),
   said coupling member (200; 600; 800) comprising one or more elongate coupling segments (202, 204, 206; 802) configured to be at least partially inserted in a longitudinally extending interior space (110, 112, 114; 702) of said crossbar member (100), and
   a safety mechanism which upon mounting said coupling member to said crossbar member actively forces a user to correctly interlock said coupling member and said crossbar member.

8. Coupling member according to clause 7, wherein said safety mechanism is configured to actively displace said crossbar member (100) inserted on said coupling member such that said crossbar member (100) and said coupling member are wrongly positioned with respect to each other for coupling the same.

9. Coupling member according to one of clauses 7 and 8, said safety mechanism comprising an urging portion for applying a force on said crossbar member in a direction urging the coupling member (200) and the crossbar member (100) away from each other, so that correctly positioning said crossbar member (100) on said coupling member (200) has to be carried out against a predetermined urging force.

10. Coupling member according to clause 9, wherein said urging portion comprises an urging member which is configured to apply a predetermined urging force on said crossbar member when said crossbar member is correctly positioned on said coupling member.

11. Coupling member according to clause 10, wherein said urging portion comprises an elastic member, for example a spring, in particular a coil spring.

12. Coupling member according to clause 11, wherein said elastic member is configured to apply a force in longitudinal direction of said coupling member.

13. Coupling member fixable to an end portion (102) of a crossbar member (100; 700), said coupling member (200) being configured for coupling two crossbar members (100) to each other or for coupling a crossbar member (100) to a load carrier foot (20), wherein said coupling member can be a part, preferably an integral part, of said load carrier foot (20),
   said coupling member (200; 600; 800) comprising one or more elongate coupling segments (202, 204, 206; 802) configured to be at least partially inserted in a longitudinally extending interior space (110, 112, 114; 702) of said crossbar member (100),
   preferably a coupling member according to one of clauses 7 to 12,
   wherein at least a portion of an outer circumferential surface 109 of at least one elongate coupling segment is colored for signalizing an incorrect coupling to a user if said crossbar member (100) is wrongly positioned with respect to said coupling member.

14. Rack system comprising a coupling member (200) according to clause 13 and a crossbar member (100) according to one of clauses 1 to 6.

Sixth Configuration:

1. Coupling member (200) fixable to an end portion (102) of a crossbar member (100; 700), said coupling member (200) being configured for coupling two crossbar members (100) to each other or for coupling a crossbar member (100) to a load carrier foot (20), wherein said coupling member can be a part, preferably an integral part, of said load carrier foot (20),
   said coupling member (200; 600; 800) comprising one or more elongate coupling segments (202, 204, 206; 802) configured to be at least partially inserted in a longitudinally extending interior space (110, 112, 114; 702) of said crossbar member (100), and
   a locking mechanism (1300) for locking said coupling member (200) to said crossbar member (100), said locking mechanism (1300) comprising an actuating portion (1310) configured to apply a clamping force on said crossbar member and an operating portion (1320) operatively coupled to said actuating portion (1310) for moving said actuating portion (1310) between a locking position and an unlocking position.

2. Coupling member (200) according to clause 1, wherein said actuating portion (1310) is provided, in particular accommodated, in one coupling segment (204) of said one or more elongate coupling segments (202, 204, 206).

3. Coupling member (200) according to clause 2, wherein said actuating portion (1310) is movably held, preferably movable in a direction cross to, for example perpendicular to, a main extension direction, in particular a longitudinal direction, of said one of said one or more coupling segments by a spring mechanism (1340), wherein said spring mechanism (1340) preferably comprises a plate spring (1341), for example a plate spring coupled to an upper wall (201) of said one elongate coupling segment (204) at two positions, preferably at its end portions (1342), or a cantilevered plate spring coupled to an upper wall of said elongate coupling segment at one end portion with the actuating portion (1310) being held in an opposite end portion.

4. Coupling member (200) according to one of the preceding clauses, wherein said actuating portion (1310) comprises an engaging portion (1311) configured to engage with a receiving portion (1400) on said crossbar member (100).

5. Coupling member (200) according to clause 4, wherein said engaging portion (1311) comprises a tapering portion tapering towards a forward end of said engaging portion (1311), for example a conical engaging portion (1313), configured to be inserted into said receiving portion (1400), for example into a receiving opening (1423) formed in said receiving portion (1400).

6. Coupling member (200) according to clause 5, wherein said actuating portion (1310) comprises one or more of the following features:
   a threaded opening (1314) extending along a central axis and configured to be coupled to a force transfer portion (1330),
   a supporting portion (1312) configured for non-rotatably supporting said engaging portion (1311) on said spring mechanism (1340), wherein said supporting portion (1312) may at least partially comprises a non-circular outer circumferential surface, for example with at least one plane surface area (1315).

7. Coupling member (200) according to clause 2, wherein said actuating portion (1310) is integrated in a lower wall portion of one of said one or more elongate coupling segments.

8. Coupling member (200) according to one of the preceding clauses, further comprising a force transfer portion (1330) for transferring an operating force from said operating portion (1320) to said actuating portion (1310), wherein said force transfer portion (1330) may comprise a rod or bolt, in particular a rod or bolt threadedly engageable with said actuating portion and/or said operating portion (1320).

9. Coupling member (200) according to one of the preceding clauses, wherein said operating portion (1320) comprises a push arrangement (1340) operatively coupled to said force transfer portion (1330) and configured to apply a pushing force on said force transfer portion (1330) for moving said actuating portion (1310), said push arrangement (1340) preferably comprising a push button (1343).

10. Coupling member (200) according to one of the preceding clauses, wherein said operating portion (1320) comprises a rotation arrangement (1350) operatively coupled to said force transfer portion (1330) for rotating the same, wherein said force transfer portion (1330) is coupled to said actuating portion (1310) such that a rotation of said force transfer portion (1330) is transferred into a translational movement of said actuating portion (1310).

11. Coupling member (200) according to clause 10, wherein said rotation arrangement (1350) may be coupled to said force transfer portion (1330), for example rotationally fixed but pivotable or longitudinally slidable, preferably against an urging force of an urging member, so that said rotation arrangement (1350) may be pivoted with respect to or longitudinally displaced along said force transfer portion (1330) by a user, for example for establishing or releasing a positive locking of said rotation arrangement (1350),
   wherein said rotation arrangement (1350) may comprise a knob (1351), which knob (1351) may comprise wings (1352) for grasping the same,
   or wherein said rotation arrangement (1350) may comprise a lever (1370) with a coupling portion (1371) at a first end portion thereof and an engaging portion (1375) at a second end thereof, said coupling portion (1371) preferably comprising an accommodating recess (1372) being non-circularly formed according to the shape of a counter portion, for example a bolt head, on said force transfer portion, for example comprising a hexagonal, octagonal or other polygonal shape, and/or a supporting portion (1373) comprising a through opening for slidably receiving a portion of said force transfer portion (1330) and being arranged at a distance from said accommodating recess (1372) in an extension direction of an inserted force transfer portion (1330), wherein an urging member (1377), for example a coil spring, may be provided in a space between said supporting portion (1373) and said coupling portion (1371), in particular such that said urging member (1377) contacts said supporting portion (1373) and a portion on said force transfer member (1330), for example a bolt head, so that said lever (1370) may be moved along said force transfer member (1330) against an urging force of said urging member (1377),
   wherein said supporting portion (1373) may be configured to contact an inserted crossbar member (100) on a side facing away from said coupling portion (1371) and to support said urging member (1377) on a side facing towards said coupling portion (1371),
   wherein said engaging portion (1375) comprises a recess (1376) for accommodating a protrusion, for example a portion of a fixation member (1378) for coupling a crossbar member (100) to said coupling member (200).

12. Coupling member (200) according to one of the preceding clauses wherein said operating portion (1320) comprises a pull arrangement (1360) operatively coupled to said force transfer portion (1330) and configured to apply a pulling force on said force transfer portion (1330) for moving said actuating portion (1310), said pull arrangement (1360) preferably comprising a lever arrangement operatively coupled to said force transfer portion (1330) by means of a pivot (1366), for translatory moving the same, wherein said pull arrangement (1360) preferably comprises a lever (1361) with a rear supporting portion (1362) for supporting the same on an outer surface of a crossbar member (100) and a forward supporting portion (1363) for supporting the same on an outer surface of a crossbar member (100), wherein said rear supporting portion (1362) and said forward supporting portion (1363) are provided on opposite sides of said pivot (1366), wherein said rear supporting portion (1362) may be coupled to said lever (1361) via an elastic portion (1364) and may be configured to contact an outer surface portion, wherein said forward receiving portion may be configured to get in contact with at least one actuating protrusion (150) provided on said crossbar member (100), said actuating protrusion (150) being provided on an end portion of said crossbar member (100) and being configured to urge said forward supporting portion (1363) in a direction facing away from said coupling member (200) upon inserting said crossbar member (100) on said coupling member (200) thereby displacing said pivot (1366) and applying a pulling force on said force transfer portion (1330).

13. Crossbar member (100) couplable to a coupling member according to clause 12, said crossbar member (100) comprising an actuating protrusion (150) on an outer surface of an end portion thereof for operating said pull arrangement (1360), said actuating protrusion (150) comprising a lifting portion (151) with a wedge like portion (152) with an inclined surface which extends from said outer surface of said crossbar member (100) and is configured to move said forward supporting portion (1363) in a direction away from said elongate coupling segment, and an arresting portion (153) continuing from said lifting portion (151) and comprising a recess (154) in which said forward supporting portion (1363) may rest in a state in which said crossbar member (100) is correctly inserted on said coupling member (200).

14. Crossbar member according to one of the preceding clauses, wherein in addition or alternatively said coupling member may comprise an accommodating portion (1500) configured to at least partially receive said rotation arrangement (1350), wherein said accommodating portion (1500) may be configured to conceal a portion of said rotation arrangement and/or may be configured to serve as an abutment portion or rotation stop for said rotation arrangement (1322), wherein said accommodating portion (1500) may be movably, slidably and/or pivotably arranged on said crossbar member (100) so as to transfer said accommodating portion (1500) between a position in which said rotation arrangement (1350) is partially received therein and a position in which said rotation arrangement (1350) is not received therein and allowed to rotate.

15. Rack system comprising a crossbar member according to one of clauses 13 and 14 and/or a coupling member according to one of clauses 1 to 12.

Seventh Configuration:

1. Coupling member (200; 600; 800; 1100) fixable to an end portion (102) of a crossbar member (100; 700; 1000) comprising a fixation profile (140), said coupling member (200; 600; 800; 1100) being configured for coupling two crossbar members (100; 700; 1000) to each other or for coupling a crossbar member (100) to a load carrier foot (20), wherein said coupling member can be a part, preferably an integral part, of said load carrier foot (20), said coupling member (200) comprising one or more elongate coupling segments (202, 204, 206; 802) configured to be at least partially inserted in longitudinally extending interior spaces (110, 112, 114; 702) of said crossbar member (100), wherein in a state in which said crossbar member (100) is mounted on said coupling member, at least one elongate coupling segment of said one or more elongate coupling segments is provided below said fixation profile such that said fixation profile at least partially covers an upper portion of said at least one elongate coupling segment.

2. Rack system (1) comprising a coupling member according to clause 1 and a crossbar member (100) comprising a fixation profile (140).

3. Rack system (1) according to clause 2, wherein said fixation profile (140) comprises a T-track open in upward direction of said crossbar member (100).

Eighth Configuration:

1. Rack system comprising a collapsible crossbar and two feet for mounting said crossbar to a vehicle, said crossbar comprising a telescoping portion allowing to change an overall length of said crossbar for adapting said length of said crossbar to different vehicle types.

2. Rack system according to clause 1, wherein said crossbar comprises at least two crossbar members, for example crossbar members as described herein with respect to the other aspects, embodiments and configurations as mentioned above, mountable to each other to form said crossbar, for example mountable to each other by way of a coupling member as described herein, wherein at least one of said crossbar members comprises said telescoping portion.

The invention claimed is:

1. A coupling member for a vehicle roof rack, the coupling member comprising:
a first elongate coupling segment and a second elongate coupling segment coupled by a coupling portion,
wherein the first elongate coupling segment comprises a first wall, and the second elongate coupling segment comprises a second wall facing the first wall, and the coupling portion extends from the first wall to the second wall, and
wherein the first elongate coupling segment, the second elongate coupling segment, and the coupling portion define a receiving space configured to receive a portion of an interior wall of a crossbar member of the vehicle roof rack.

2. The coupling member of claim 1, wherein the first elongate coupling segment further comprises an engagement portion configured to engage an interior engaging portion of the crossbar member.

3. The coupling member of claim 2, wherein the engagement portion comprises a hook.

4. The coupling member of claim 2, wherein the coupling portion is disposed between the engagement portion and the receiving space in a longitudinal direction.

5. The coupling portion of claim 2, further comprising a second engagement portion extending from the second elongate coupling segment configured to engage a second interior engaging portion of the crossbar member.

6. The coupling member of claim 2, wherein the engagement portion extends laterally from the first elongate coupling segment.

7. The coupling member of claim 2, wherein the engagement portion is disposed in an upper portion of the first elongate coupling segment.

8. The coupling member of claim 1, wherein the first elongate coupling segment comprises a cantilevered portion.

9. The coupling member of claim 1, wherein a length of the coupling portion in a longitudinal direction of the coupling member is less than a length of the first elongate coupling segment in the longitudinal direction of the coupling member and a length of the second elongate coupling segment in the longitudinal direction of the coupling member.

10. The coupling member of claim 1, wherein the coupling portion is disposed between the first wall and the second wall.

11. The coupling member of claim 1, wherein the first elongate coupling segment comprises a hollow area.

12. The coupling member of claim 1, further comprising a third elongate coupling segment and a second coupling portion disposed between the first elongate coupling segment and the third elongate coupling segment.

13. The coupling member of claim 1, further comprising an urging member configured to bias the coupling member toward a lower interior wall of the crossbar member.

14. A coupling member for a vehicle roof rack, the coupling member comprising:
a first elongate coupling segment and a second elongate coupling segment coupled by a coupling portion disposed between the first elongate coupling segment and the second elongate coupling segment, wherein the coupling portion comprises an upper surface forming an upper channel with the first elongate coupling segment and the second elongate coupling segment, and a bottom surface forming a lower channel with the first elongate coupling segment and the second elongate coupling segment, and wherein the first elongate coupling segment, the second elongate coupling segment, and the coupling portion define a receiving space extending in a longitudinal direction of the coupling member and configured to receive a portion of an interior wall of a crossbar member of the vehicle roof rack.

15. The coupling member of claim 14, wherein the upper channel is configured to receive an upper portion of the interior wall of the crossbar member, and the lower channel is configured to receive a lower portion of the interior wall of the crossbar member.

16. A roof rack for a vehicle comprising:
a load bar;
a coupling member configured to couple to an end of the load bar; and
a foot configured to couple the load bar to the vehicle roof, wherein the coupling member comprises a first elongate coupling segment and a second elongate coupling segment coupled by a coupling portion disposed between the first elongate coupling segment and the second elongate coupling segment, and wherein the load bar is configured to receive the first elongate coupling segment in a first hollow portion of the load bar and the load bar is configured to receive the second elongate coupling segment in a second hollow portion of the load bar.

17. The roof rack of claim 16, wherein the load bar is coupled to the foot by the coupling member.

18. The roof rack of claim 16, wherein the coupling member is integrally formed with the foot.

19. The roof rack of claim 16, wherein the load bar is configured to receive the first elongate coupling segment on a first side of an interior wall of the load bar and the load bar is configured to receive the second elongate coupling segment on a second side of the interior wall.

20. The roof rack of claim 16, further comprising a second load bar, wherein the coupling member is configured to couple the second load bar with the load bar.

* * * * *